US012180826B2

(12) United States Patent
Iriarte Lopez et al.

(10) Patent No.: US 12,180,826 B2
(45) Date of Patent: Dec. 31, 2024

(54) REAL-TIME ANALYSIS OF IN-FIELD COLLECTED WELL FRACTURING DATA

(71) Applicant: Well Data Labs, Inc., Denver, CO (US)

(72) Inventors: Jessica G. Iriarte Lopez, Denver, CO (US); Alberto J. Ramirez Ramirez, Denver, CO (US); Carly T. Wolfbrandt, Denver, CO (US); Samid A. Hoda, Thornton, CO (US); Mary S. Van Domelen, Edmond, OK (US)

(73) Assignee: Well Data Labs, Inc., Denver, CO (US)

( * ) Notice: Subject to any disclaimer, the term of this patent is extended or adjusted under 35 U.S.C. 154(b) by 453 days.

(21) Appl. No.: 16/931,288

(22) Filed: Jul. 16, 2020

(65) Prior Publication Data

US 2021/0017853 A1   Jan. 21, 2021

Related U.S. Application Data

(60) Provisional application No. 62/874,864, filed on Jul. 16, 2019, provisional application No. 62/874,951, filed on Jul. 16, 2019.

(51) Int. Cl.
*G06F 30/18* (2020.01)
*E21B 21/08* (2006.01)
(Continued)

(52) U.S. Cl.
CPC .............. *E21B 47/06* (2013.01); *E21B 21/08* (2013.01); *G06N 20/00* (2019.01); *G06F 2218/02* (2023.01)

(58) Field of Classification Search
CPC .... G06K 9/00503; G06N 20/00; E21B 21/08; E21B 47/06
(Continued)

(56) References Cited

U.S. PATENT DOCUMENTS

| 2011/0247824 A1* | 10/2011 | Gu ......................... E21B 43/26 |
| | | 166/308.1 |
| 2015/0129211 A1* | 5/2015 | Dusseault ............. E21B 49/006 |
| | | 166/280.1 |

(Continued)

OTHER PUBLICATIONS

International Searching Authority, International Search Report and Written Opinion, issued for International Application No. PCT/US2020/042403, mailed Oct. 15, 2020 (9 pages).

*Primary Examiner* — Andre Pierre Louis
(74) *Attorney, Agent, or Firm* — Gregory P. Durbin; Polsinelli PC

(57) ABSTRACT

One or more aspects of the present disclosure are directed to cloud based applications that automatically and quickly identify start and end times of fracturing stages in real-time as well as one or more additional performance characteristics of the fracturing process. In one aspect, a method for real-time analysis of well data includes receiving treating data for a well in real-time, the treating data including one or more of a treating pressure channel and a slurry rate channel; preprocessing the treating data; identifying one or more stages of one or more fracturing processes in association with which the treating data is received; identifying, automatically and in real-time, a start time and an end time for each of the one or more stages; and generating a visual output of the start time and the end time of each of the one or more stages.

20 Claims, 27 Drawing Sheets

(51) Int. Cl.
*E21B 47/06* (2012.01)
*G06N 20/00* (2019.01)

(58) Field of Classification Search
USPC .............................................. 703/5
See application file for complete search history.

(56) References Cited

U.S. PATENT DOCUMENTS

| | | | | |
|---|---|---|---|---|
| 2016/0003020 | A1* | 1/2016 | Sharma | E21B 49/006 |
| | | | | 166/308.1 |
| 2016/0042272 | A1* | 2/2016 | Mohaghegh | G06N 3/047 |
| | | | | 706/19 |
| 2019/0024505 | A1* | 1/2019 | Coenen | E21B 43/267 |
| 2021/0017845 | A1* | 1/2021 | Madasu | G06N 3/084 |

\* cited by examiner

REAL-TIME ANALYSIS OF IN-FIELD COLLECTED WELL FRACTURING DATA

CROSS-REFERENCE TO RELATED APPLICATIONS

This application is related to and claims priority under 35 U.S.C. § 119 from U.S. Provisional Application No. 62/874,864 filed Jul. 16, 2019 entitled "Offline and Real-Time Start and End Times Detection" and U.S. Provisional Application No. 62/874,951 filed Jul. 16, 2019 entitled "Offline and Real-Time Start and End Times Detection", both of which are hereby incorporated by reference in their entirety.

TECHNICAL FIELD

Aspects of the present disclosure involve machine learning analysis of time sequenced fracture data to uniformly and automatically identify events, such as a start time and end time, of a treatment sequence within the data as well as real-time detection of fracturing events.

BACKGROUND

A component of the modern hydraulic fracturing process is streaming (continuously generating and transmitting) high-frequency data from the field to remote locations for monitoring, storage, and analysis. Analyzing this data in real-time can be especially challenging during zipper fracturing operations, which involve several wells and potentially more than one fracturing crew. The recorded data can include several hundred channels, each collecting data points every second. The designation of the stage start and end time is very important because these boundaries govern summary fracturing statistics calculations, such as pressures, pumping rates, and concentrations. Relying on manual selection of staging flags is often very time consuming, sometimes inaccurate, and often inconsistent due to a lack of a uniform selection method or interpretation across individuals and organizations.

It is with these observations in mind, among others, that aspects of the present disclosure were conceived.

SUMMARY

One or more aspects of the present disclosure are directed to enabling real-time analysis of various fracturing data and statistics collected in the field and in relation to multiple parallel and/or simultaneous fracturing processes such as zipper fracturing processes. Such real-time analysis of data collected across multiple wells includes detection of start and end times of various fracturing stages using machine learning processes as well as real-time detection of one or more fracturing event and performance issues during the fracturing process.

In one aspect, a method for real-time analysis of well data includes receiving treating data for a well in real-time, the treating data including one or more of a treating pressure channel and a slurry rate channel; preprocessing the treating data; identifying one or more stages of one or more fracturing processes in association with which the treating data is received; identifying, automatically and in real-time, a start time and an end time for each of the one or more stages; and generating a visual output of the start time and the end time of each of the one or more stages.

In another aspect, identifying the one or more stages, the start time and the end time are based on using a trained machine learning process.

In another aspect, identifying the one or more stages of the one or more fracturing processes includes applying a trained stage splitting model to approximate the one or more stages; and detecting one or more pressure tests in association with the approximated one or more stages; and refining the approximated one or more stages using the one or more pressure tests.

In another aspect, the trained stage splitting model approximates the one or more stages by down-sampling the treating pressure channel and the slurry rate channel; generating an auxiliary interstage channel that is indicative of gaps between two or more stages; and flagging the one or more stages using the auxiliary interstage channel.

In another aspect, detecting the one or more pressure tests includes clipping slurry rate data of the slurry rate channel; determining a slurry rate volume using the clipped slurry rate data; normalizing the treating pressure channel and the slurry rate channel; generating a binary pressure test channel based on the normalized treating pressure channel and the normalized slurry rate channel; and identify the one or more pressure tests based on the binary pressure test channel.

In another aspect, determining the start time includes clipping the slurry rate channel and the treating pressure channel; generating a binary channel using the clipped slurry rate and treating pressure channels; identifying one or more time instances when a value of the binary channel is equal to zero; and generating a flag for the start time of each stage at a last time instance when the value of the binary channel is zero.

In another aspect, determining the end time includes smoothing the slurry rate channel and the treating pressure channel; generating an auxiliary stage volume channel based on the smoothed slurry rate channel; generating an auxiliary pressure channel based on the smoothed treating pressure channel; and generating the end time when at least the auxiliary stage volume channel and the auxiliary pressure channel each satisfy a corresponding condition.

In another aspect, the method further includes detecting, in at least one of the one or more stages, at least one instance of a pressure change, the pressure change being indicative of at least one in-field operation issue during a fracturing process; and generating a visual flag for each detected pressure change.

In another aspect, the method further includes detecting, in at least one of the one or more stages, a step-down test; and generating a visual flag for each detected step-down test.

In another aspect, the identification of the one or more stages and the start time and the end time of the one or more stages are performed simultaneously for a plurality of wells.

In another aspect, the method further includes detecting, in at least one of the one or more stages, a change in well pressure monitoring that is more than a threshold; and generating a visual flag corresponding to the increase in the well pressure monitoring, the visual output identifying a corresponding job time and a corresponding active well In one aspect, a network controller includes one or more memories having computer-readable instructions stored therein and one or more processors. The one or more processors configured to execute the computer-readable instructions to receive treating data for a well in real-time, the treating data including one or more of a treating pressure channel and a slurry rate channel; preprocess the treating data; identify one or more stages of one or more fracturing processes in association with which the treating data is received; and identify, automatically and in real-time, a start time and an end time for each of the one or more stages; and generate a visual output of the start time and the end time of each of the one or more stages.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters may refer to the same parts or similar throughout the different views. It is intended that the embodiments and figures disclosed herein are to be considered illustrative rather than limiting.

DETAILED DESCRIPTION

Figure 1:
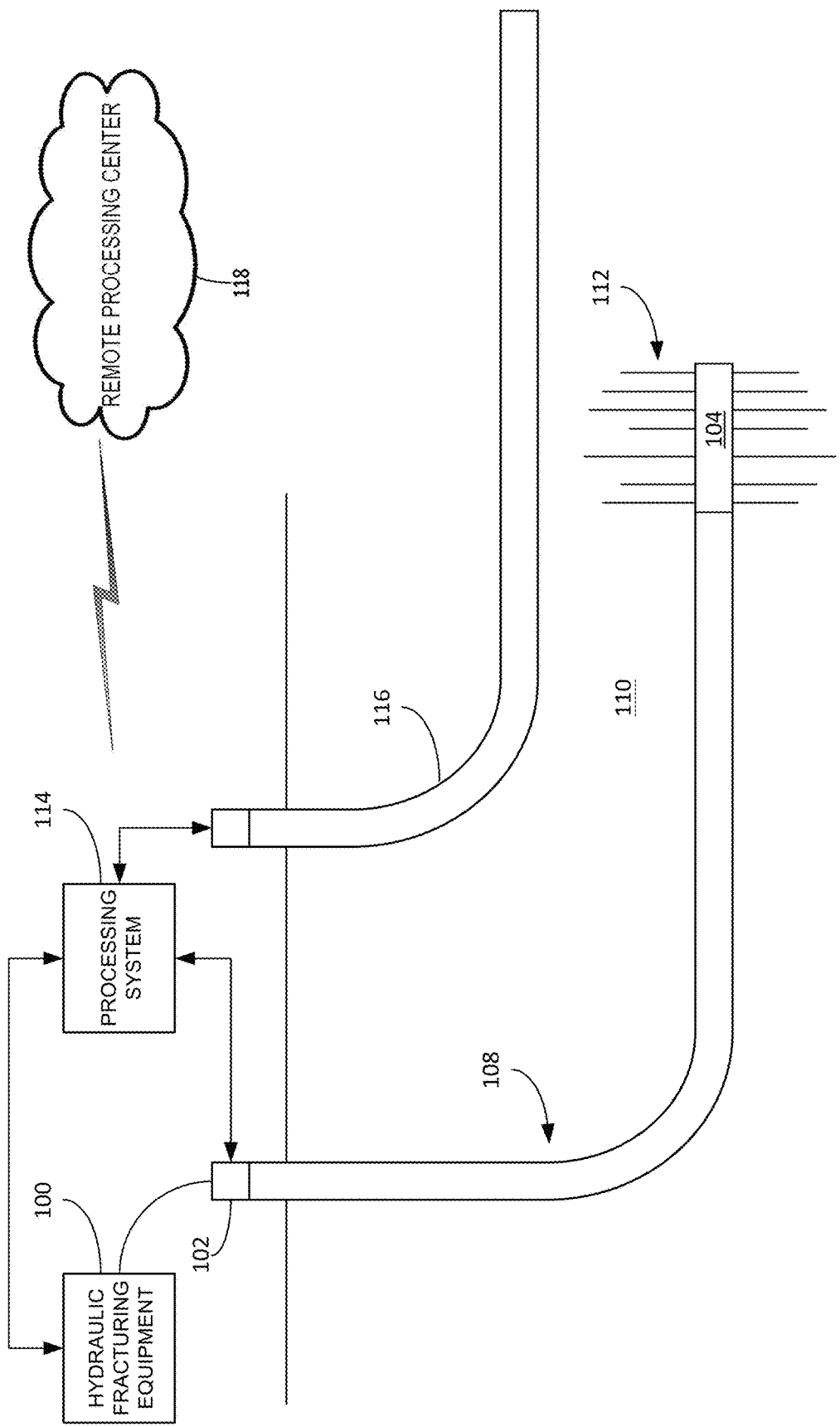
FIG. 1 illustrates an example on-site setting for performing a fracturing process, according to an aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As noted above, a component of the modern hydraulic fracturing process is streaming (continuously generating and transmitting) high-frequency data to equipment in the field and from the field to remote locations for monitoring, storage, and analysis. Analyzing this data is challenging in real-time and can be especially challenging during zipper fracturing operations, which involve several wells and potentially more than one fracturing crew. The recorded data can include numerous channels, sometimes in the hundreds, each collecting data points, often every second, related to operations involved in completing a well including operations associated with hydraulically fracturing a well. In hydraulic fracturing, a stage refers to a discrete section of a horizontal portion of a well, typically separated from other parts of the well by packers. Hydraulic fracturing involves pumping fluid under relatively high pressure into the stage where the fluid flows through perforations into the formation surrounding the well to fracture the formation and allow hydrocarbons to then flow into the well and to the surface. The designation of the stage start and end time—when fracturing begins and ends in a given stage—is important because these boundaries govern summary fracturing statistics calculations, such as pressures, pumping rates, and proppant concentrations. Relying on manual selection of staging flags is often very time consuming, sometimes inaccurate, and often inconsistent due to a lack of a uniform selection method or interpretation across individuals and organizations. Manually identifying the start and end of stage, among many data channels and noisy signals, is even more challenging.

One or more aspects of the present disclosure are directed to cloud based applications that utilize machine learning processes to automatically and quickly detect a start and an end of the hydraulic fracturing of a stage in real-time as data collected in the field are streamed from on field data collection centers to one or more remote data processing centers. The methods discussed herein while presented in the context of a cloud system are equally applicable to data collected and processed in the field.

Real-time collection and analysis of field data provides the ability to react quickly to new information about any underlying formation's response to a treatment. The ability to react quickly can provide improved operational performance, e.g., decreased operations time, better use of materials, reduced costs, etc. Moreover, being able to quickly and accurately identify the state and end of stage, allows for the analysis of the data for a stage to obtain information that can then be used to modify treatment of a subsequent stage or stages of the same well, and modify operations conducted in an adjacent well in the same formation, whether or not during zipper operations.

A cloud based platform of the present disclosure with a web-based analysis tool provides a central repository and consistent interface that utilizes machine learning models for preprocessing (e.g., cleaning, de-noising, re-sequencing, and evaluating for quality control) incoming data and analyzing multiple channels such as slurry rate and treating pressure channels. The analysis includes generating several auxiliary or higher order channels to help identify key events such as a start and an end of fracturing a discrete stage, which can be applied to additional stage of a well or wells. The system can identify the start and end by flagging data in a particular channel, flagging time events associated with the start and end, which time events are applicable to multiple channels, and otherwise.

Accurately and consistently identifying key events, such as the start and end of each stage enables real-time reporting of important metrics including stage pressures, rates, and concentrations. These metrics can then feed reports that help track operating efficiencies, such as durations, volumes, horsepower, and non-productive time. More advanced workflows allow real-time stage comparisons to be visually aligned on identified events such as the start of each stage, at breakdown, achieving the target rate, or at proppant initiation, etc.

The disclosure begins with an overview of an on-site fracturing setting.

FIG. 1 illustrates an example on-site setting for performing a fracturing process, according to an aspect of the present disclosure.

The system diagram is representative of a hydraulic fracture system 100 operably coupled with a well head 102, and set up to hydraulically fracture stages 104 of a horizontal section 106 of a wellbore 108. The hydraulic fracturing equipment may include pump trucks, sources of water (e.g., water trucks), and sources of proppant, diverter, and other substances that may be combined with water and injected into the well as part of the hydraulic fracturing process. In some configurations, a pump truck is connected to the well head 102 to pump, under controlled pressure and rate, the hydraulic fracturing fluid into the well which flows through a well casing (not shown) to the stage 104 being hydraulic fractured. The casing of the stage has been perforated such that fluid pumped into the stage can flow through the perforations to open fractures 112 in the formation 110 surrounding the well. For illustration, only one stage is shown at the toe of the well; however, a horizontal section typically has numerous stages as a horizontal section of a well may be thousands of feet, and stages are discrete sections around one hundred feet. In some systems discussed herein, data and interactions with an offset well 116 may further be assessed. The offset well 116 may be fitted with various possible sensors for measuring pressure, e.g., tubing pressure in one example, within the well or within some portion or portions of the well. The well and the equipment involved in the hydraulic fracturing process may include sensors, gauges, and other devices to monitor and record data associated with the hydraulic fracturing processes. The data may then be reported and stored at a processing system 114. The processing system 114 may involve one or more computing devices, at the well site. The processing system 114 may be in wired or wireless communication with various aspects of the well and/or the fracturing equipment.

Processing system 114 may be communicatively coupled to an off-site (remote) processing center 118. As will be described below, remote processing center 118 may receive streams of data from processing system 114 to perform real-time processing of the received data to determine start and end times of various stages of the fracturing process.

While not shown in FIG. 1, a zipper fracturing process may involve multiple wells such as well 108, each with multiple fracture stages such as stages 104. Various sensors installed in each such well may monitor statistics and data, as described above for each stage of fracturing of each well. Such data is then transmitted, using any known or to be developed method, from on-site processing systems such as processing system 114 to remote processing center 118 for analysis, as will be described below. Remote processing center 118 may also be referred to as remote processor 118 and/or controller 118.

Figure 2:
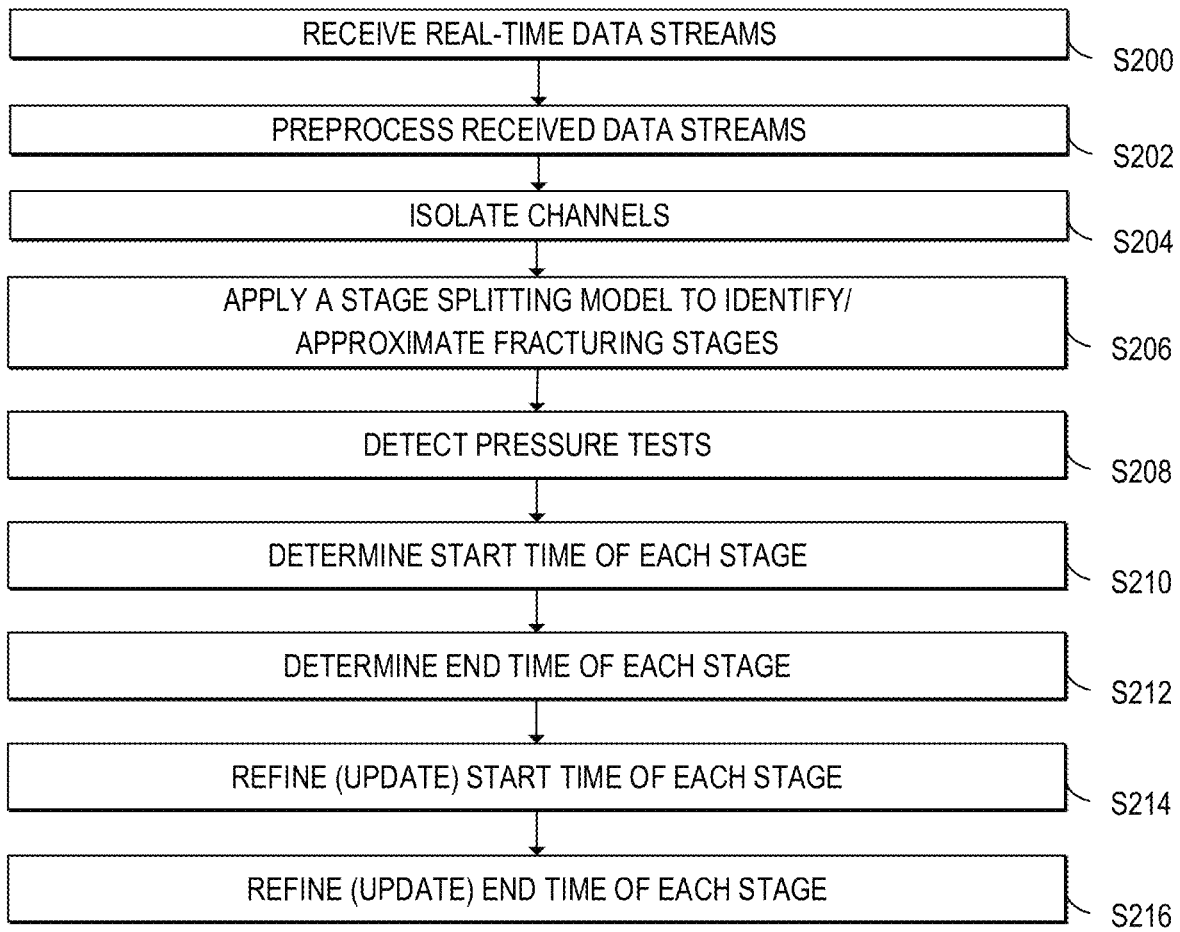
FIG. 2 is a flow chart of a process for detection of stage start and end times, according to one aspect of the present disclosure.

FIG. 2 is a flow chart of a process for detection of stage start and end times, according to one aspect of the present disclosure.

The process of FIG. 2 may be applied to a set of training data (in-field collected data) to train a model that may then be executed by controller 118 to real-time data streamed to remote processing center 118 to identify/predict fracturing stages and corresponding start and end times of each stage (as well as several exemplary performance events during the fracturing process as will be described with reference to FIGS. 17-26). A process of applying the trained model to real-time data streamed into remote processing center 118 will then be described with reference to FIG. 14.

FIG. 2 will be described from the perspective of remote processing center 118 (controller 118). However, it should be noted that controller 118 may have one or more associated memories on which computer-readable instructions are stored. The computer-readable instructions are then executed by one or more associated processors to implement each step of the process of FIG. 2. Furthermore, each step of FIG. 2 may be described with reference to one or more graphical outputs of FIGS. 3-16. Additionally, as noted elsewhere, processing may be conducted anywhere including at the well.

At S200, controller 118 receives hydraulic fracturing data streams from one or more on-site processing systems such as processing system 114 that includes fracturing information from a stage of well, and may include, over time, information from several stages of the well or wells. The data streams are typically time stamped and may be aligned in time by the system. Received data streams may include multiple channels each corresponding to a particular type of data collected by corresponding sensors in the field. Such channels include, but are not limited to, a treating pressure channel, a slurry rate channel, a clean volume channel, etc. Incoming data streams can be high-frequency hydraulic fracturing data stream with data points collected at certain intervals (e.g., 1 second intervals). For machine learning training purposes such data may have already been collected for past fracturing processes and/or may be combined with real-time incoming data streams designated as training data.

Figure 3:
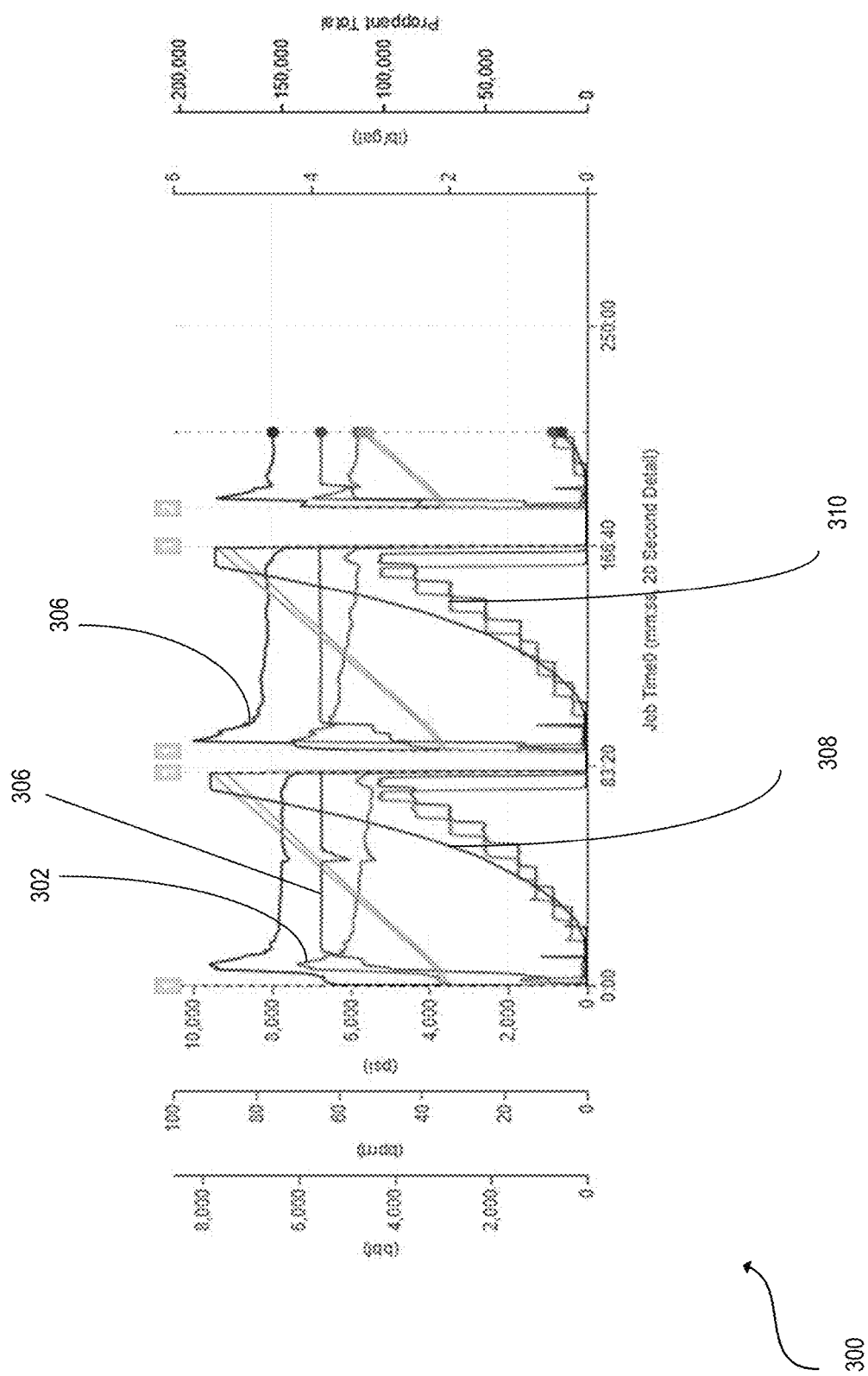
FIG. 3 is a visual representation of example high-frequency hydraulic fracturing data stream, according to one aspect of the present disclosure.

FIG. 3 is a visual representation of example high-frequency hydraulic fracturing data stream, according to one aspect of the present disclosure.

Graph 300 shows a real-time data stream from two wells over 20 second periods that include various channels (hundreds of channels) described above, such as example channels 302, 304, 306, 308, and 310 corresponding to one of slurry rate channel, treating pressure channel, clean volume channel, blender concentration channel, bottom-hole proppant concentration channel, etc.

At S202, controller 118 preprocesses the received data stream. Data received in real-time from the field is not guaranteed to be received in the correct order. Therefore, controller 118 can sort the data into chronological order. Once the data is sorted, controller 118 identifies duplicate rows (e.g., rows with the same timestamp) as they will appear consecutively in the sorted data. De-duplicating rows may be performed according to any known or to be developed method including, but not limited to, taking the mean (average) values of rows with the same timestamp, taking first value, the last value and/or the median value.

Furthermore, data received in real-time may be missing rows of data for periods of time e.g., due to poor connections, network bandwidth, etc. Although this data may eventually be received, the procedure may account for and accommodate the missing data. Accordingly, controller 118 also accounts for missing rows of data. For example, missing data may be replaced with a zero or a one or some other consistent value. Other possible methods include replacing missing values with the last available value or applying any known or to be developed interpolation technique.

Another aspect of preprocessing at S202 includes controller 118 clipping data values below zero and replacing the same with zero values.

Preprocessing at S202 may be implemented initially as new data streams are received and prior to implementing various models in the subsequent steps of the process, as will be described below, or may be applied at each step separately.

At S204, controller 118 isolates one or more channels, which can then be used for prediction/estimation of stage start and end times as will be described below. Such channels, as mentioned, include the treating pressure channel and the slurry rate channel. In another example, the channels may include a clean volume channel.

At S206, controller 118 applies a stage splitting model to incoming data streams to identify/approximate fracturing stages (distinguishing from one stage to the next, which can be indicative of the real-time process of a fracturing crew completing one stage and proceeding to the next, disconnecting and reconnecting lines and sensors, moving between different wells, etc.) In other words, the objective of stage splitting and the corresponding approximation is to distinguish fracturing operations time from idle times. At S206, controller 118 may apply a trained machine learning model for performing stage splitting. Step S206 will be described with reference to FIG. 4.

Figure 4:
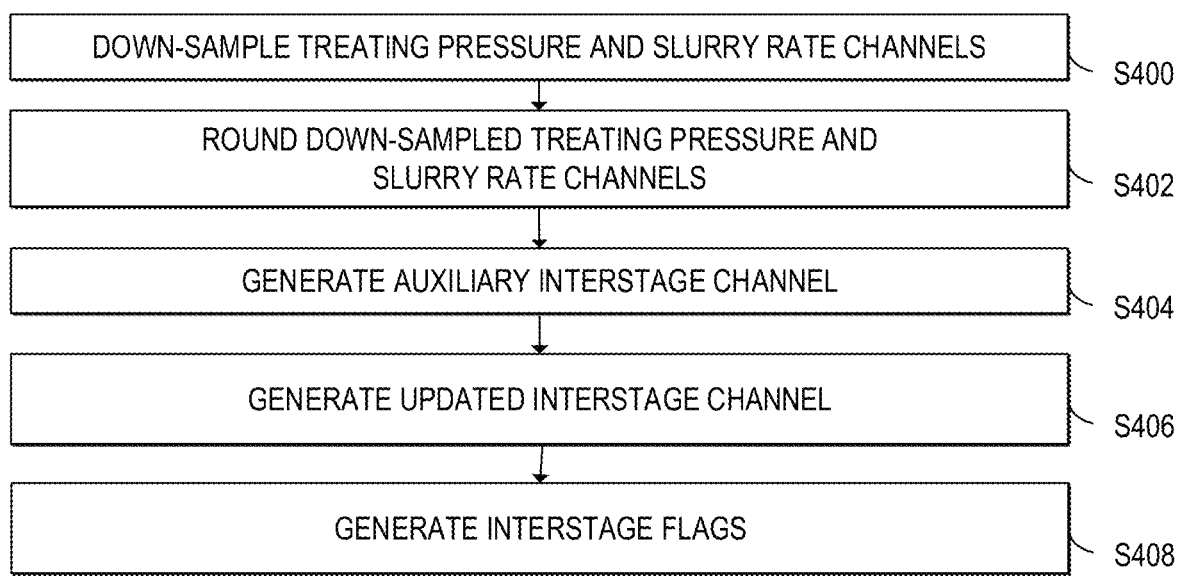
FIG. 4 is a flow chart of a stage splitting approximation process, according to one aspect of the present disclosure.

FIG. 4 is a flow chart of a stage splitting approximation process, according to one aspect of the present disclosure.

At S400, controller 118 performs down-sampling on preprocessed treating pressure and slurry rate channels. In one example, controller 118 down-samples a one-second sampling period to a one-minute sampling period using the median value of each channel. This is similar to "zooming out" on a treatment plot, which not only reduces the noise in the channel data but also reduces the size of the channel data by a factor (e.g., by sixty). This allows the stage splitting model to efficiently work with several days of streaming data.

At S402, controller 118 uses Equation 1 below to round (quantize) the values in both channels (slurry rate and treating pressure channels) into a fixed number of buckets (the resolution), where the "partial brackets" indicate the floor (rounding down) function.

$$channel_{rnd} = \lfloor resolution \times channel \rfloor / resolution \quad \text{(Equation 1)}$$

where $channel_{rnd}$ is the rounded channel (e.g., slurry rate channel or treating pressure channel and channel is the actual corresponding channel being rounded. In Equation 1 a resolution can be one of $Z_{rate}$ bpm for the slurry rate in Equation 1 and $Z_{pres}$ psi for the treating pressure in Equation 1, which are configurable parameters determined calibrated using training data.

Just as the model reduces the resolution of the time-axis by down-sampling, the rounding function reduces the resolution of the data channel axis. The resulting signal may then appear "pixelated" but still captures and highlights the important cues in the signal required to approximately identify non-productive time.

At S404, controller 118 then generates a (0/1)-valued logical auxiliary channel called an interstage channel that is equal to one precisely when: a) the slurry rate is very low (e.g., less than $R_{vmin}^{ss}$ bpm threshold), or b) when the treating pressure is low (e.g., less than $P_{min}^{ss}$ psi threshold) and the slurry rate is low (less than $R_{min}^{ss}$ bpm threshold). These example thresholds are configurable parameters that can be determined and adjusted based on hundreds of interstage intervals determined from various jobs performed by many different service companies. An interstage loosely captures the in-field operational scenario where prior to fracturing a new stage, the crew disconnects the line for the perforation operation and then reconnects the line. Notice that the logical complement of the interstage channel captures approximate intervals of productive (pumping) time. This logical complement may be captured by generating a secondary (0/1)-valued channel called stage channel defined for each time period t as stage[t]=1−interstage[t].

Figure 5:
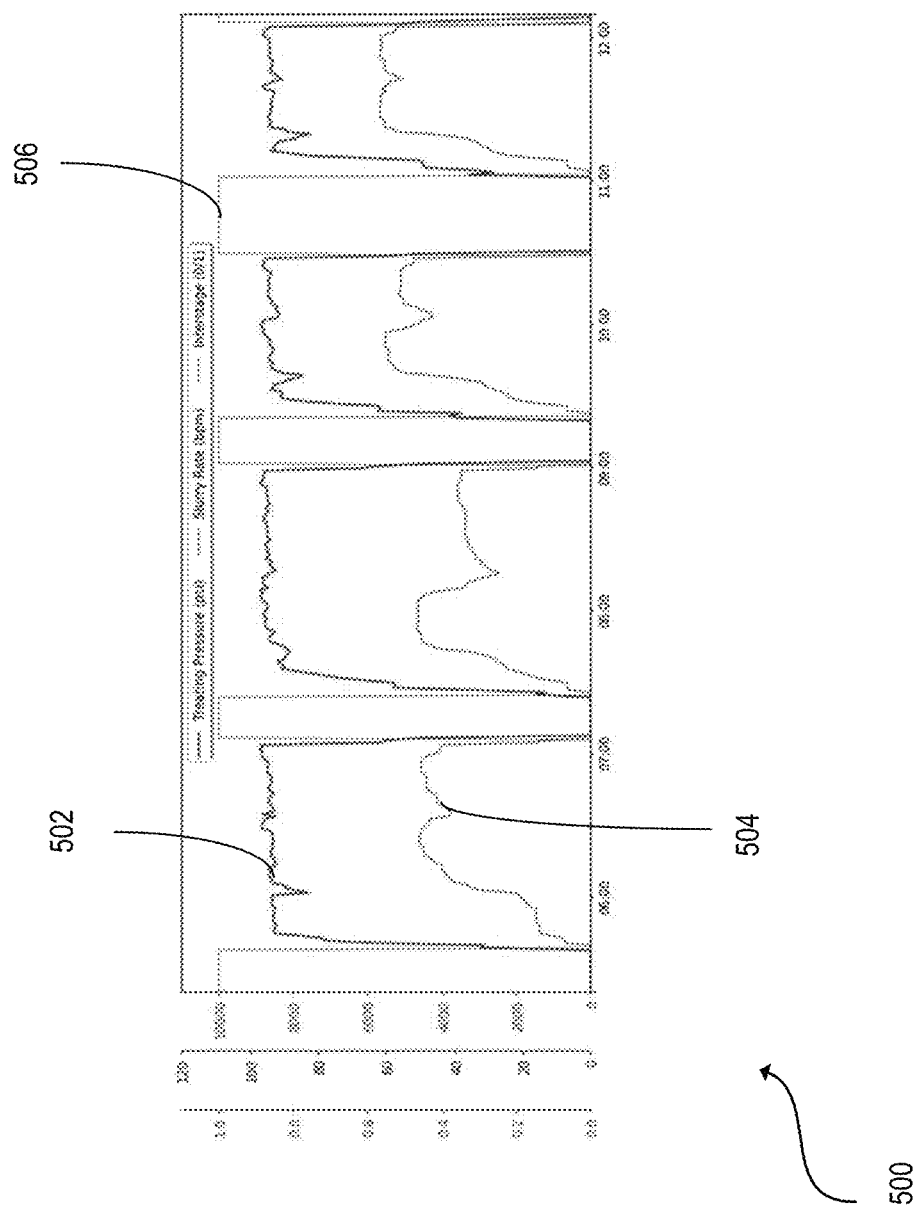
FIG. 5 illustrates an example output of down-sampling process per Equation 1 with interstage channel, according to one aspect of the present disclosure.

FIG. 5 illustrates an example output of down-sampling process per Equation 1 with interstage channel, according to one aspect of the present disclosure.

Graph 500 illustrates down-sampled treating pressure channel 502, down-sampled slurry rate channel 504 and auxiliary interstage channel 506.

Referring back to S206, at S406 controller 118 generates updated interstage channel using a signal processing technique (e.g., first-differencing signal processing technique). By using this signal processing technique, controller 118 identifies contiguous blocks of time where the interstage signal of interstage channel 406 is one. At this point, the interstage channel 406 includes artifacts in the data that a completions engineer may not consider to be productive or non-productive time depending on the artifact. Some of these artifacts correspond to sensor noise/malfunctions or short bursts of operations during non-productive intervals.

Specifically, for identifying contiguous blocks, controller 118 removes interstage periods less than $T_{min}^{ss}$ minutes by setting the interstage channel to zero during those periods. Then, controller 118 merges adjacent interstage periods that are within $T_{merge}^{ss}$ minutes of another by setting the values between the two periods to one. The thresholds $T_{min}^{ss}$ and $T_{merge}^{ss}$ are configurable parameters that may be determined/calibrated using a large variety of sample data. Operationally, the merging period can be shorter than the fastest time it takes a fracturing crew to switch lines between stages. Intuitively, this merging eliminates short bursts of operations during what is generally considered to be interstage time.

Figure 6:
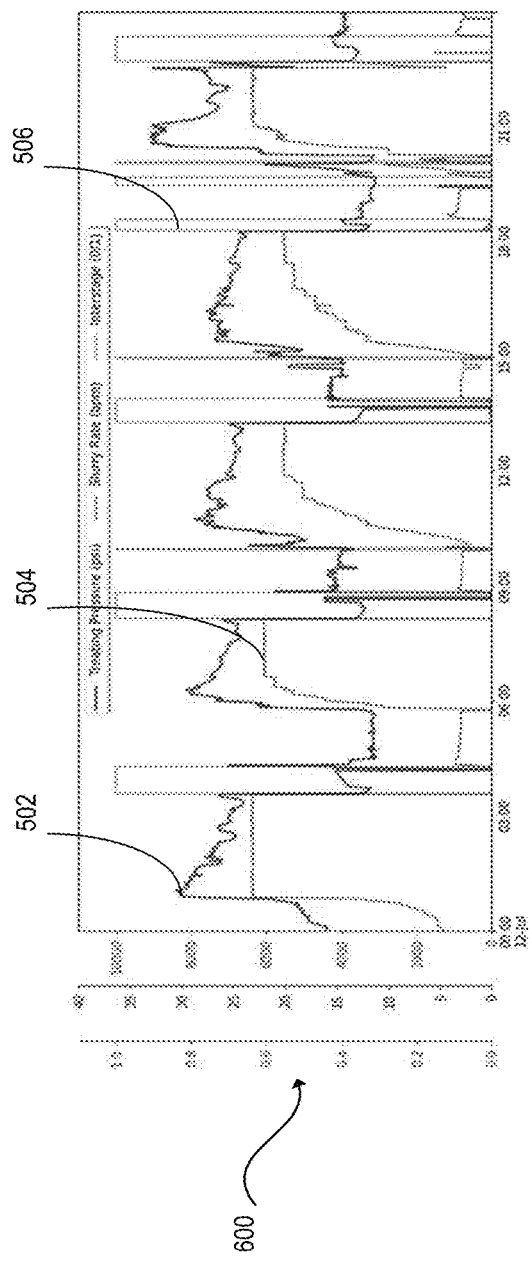
FIG. 6 illustrates example outputs of updated interstage channel, according to one aspect of the present disclosure.
Figure 6:
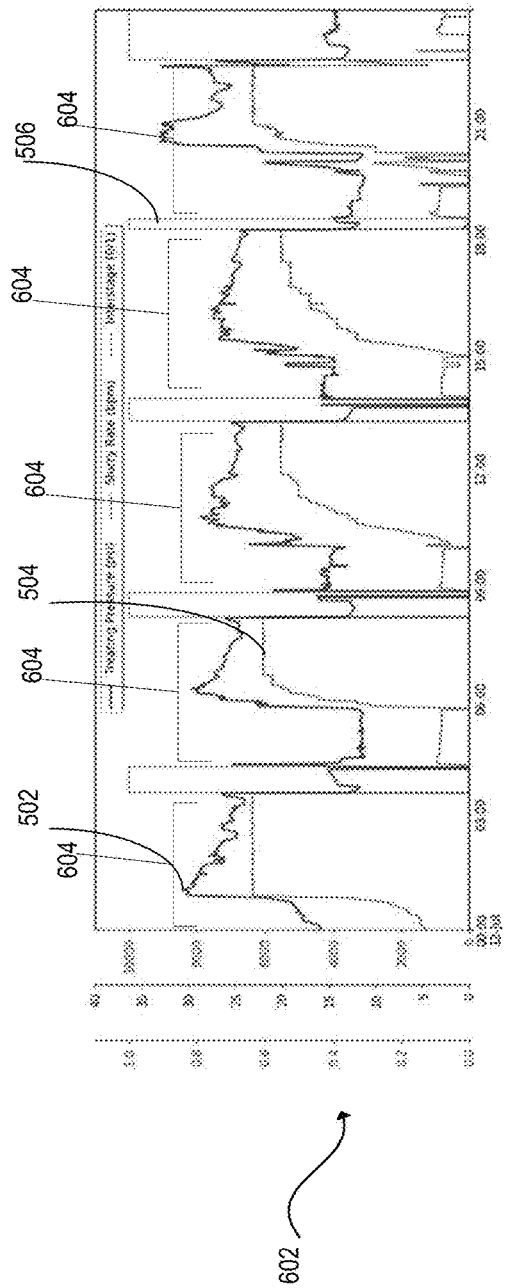

FIG. 6 illustrates example outputs of updated interstage channel, according to one aspect of the present disclosure.

Graph 600 of FIG. 6 illustrates output of removing interstage periods of interstage channel 506 that are less than $T_{min}^{ss}$ and graph 602 illustrates changes to interstage channel 506 after merging of adjacent interstage periods that are within $T_{merge}^{ss}$.

Next, auxiliary stage channel described above (complementary to interstage channel 406) is regenerated using the updated interstage channel of FIG. 6. By calculating first differences, controller 118 can isolate contiguous blocks when the stage channel is equal to one. Controller 118 determines the duration and slurry volume for each block (potential stage) and merges blocks that satisfy a particular condition related to block volumes and durations, which are configurable parameters determined based on experiments and/or empirical studies using a large corpus of data. Example blocks 604 are shown in FIG. 6. A block may be defined at as segment of incoming data between two non-zero periods of interstage channel 506 (when value of interstage channel is zero).

In one example, when any one of blocks 604 is/are modified, then the interstage channel 406 and corresponding stage channel (not shown) are updated by controller 118.

With an updated and reliable stage and interstage (0/1)-valued channels, at S408, controller 118 generates interstage flags, where each flag is placed at the middle of each updated interstage block, with an interstage block being defined at a period between two blocks when interstage channel 406 has a continuous value of 1 (e.g., vertical columns formed by interstage channel 406 shown in graph 500 of FIG. 5). The generated flags identify/approximate fracturing stages at S206.

Figure 7:
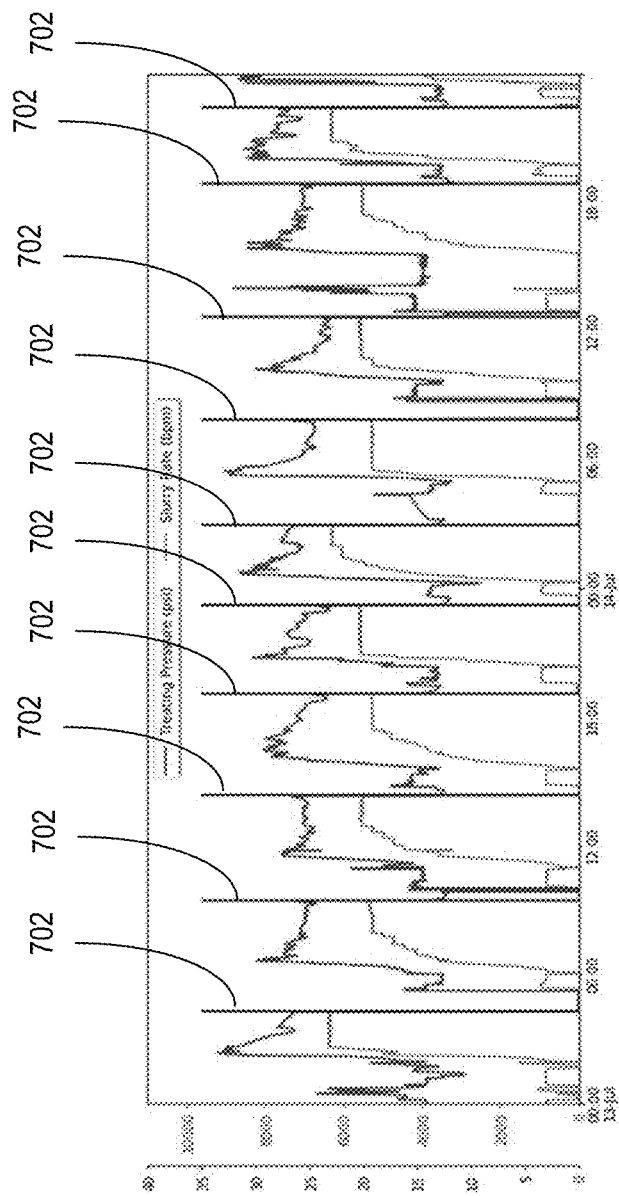
FIG. 7 illustrates an output of generating interstage flags, according to one aspect of the present disclosure.

FIG. 7 illustrates an output of generating interstage flags, according to one aspect of the present disclosure. As shown in graph 700, flags 702 are placed in the middle of each interstage block. The interstage flags may not be retained in the ultimate output and may, in some implementations, not be displayed and used only as reference.

The model creates a $T_{search}^{ss}$ minute search interval around each approximate interstage flag and refines each flag's position by moving it to the closest time that achieves the minimum pressure and rate in the corresponding search interval. Intuitively, the last step moves each approximate flag to the most central point of its corresponding interstage interval without active operations. At this point in the overall procedure, the segments of time between consecutive interstage flags are considered to be potential stages.

Referring back to FIG. 2, once initial approximation of fracturing stages are completed per process of FIG. 4, then at S208, controller 118 detects (identifies) pressure tests for further refining the initial approximation of fracturing stages at S206. Detection of pressure tests may be based on a trained machine learning model, which may be referred to as pressure test model.

In the field, before starting to pump into a well, the crew performs a pressure test to check if the line has any leaks. That pressure test indicates they are pumping into a new stage, which may potentially be a new well. However, there can be more than one pressure test per stage, and controller 118 should be able to identify multiple pressure tests without mislabeling any of them as the start of a new stage. Detection of pressure tests will be further described with reference to FIG. 8.

Figure 8:
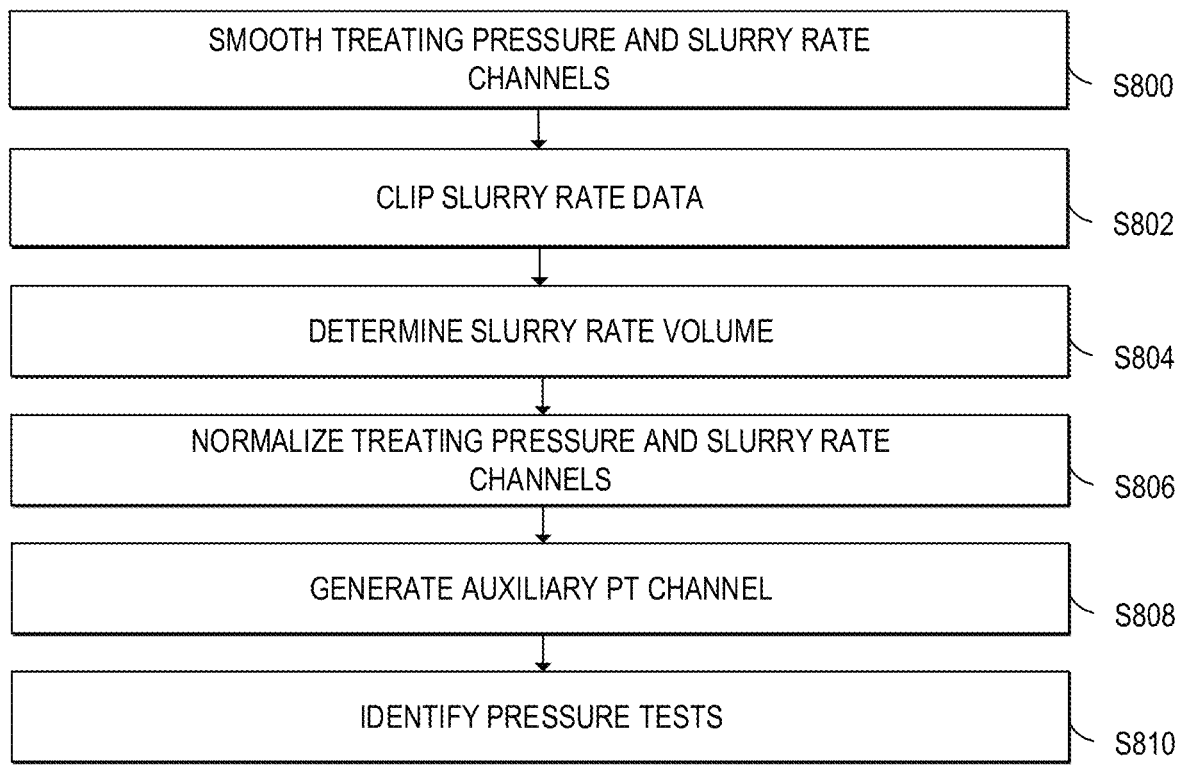
FIG. 8 is a flow chart of a pressure test detection process, according to one aspect of the present disclosure.

FIG. 8 is a flow chart of a pressure test detection process, according to one aspect of the present disclosure.

At S800, controller 118 smooths the treating pressure and slurry rate channels using a short window median smoother.

At S802, controller 118 clips slurry rate at the top to $R_{clip}^{pt}$ bpm to mitigate the effect of erroneous outliers in subsequent calculations.

At S804, controller 118 determines a slurry volume channel as the cumulative sum (integral) of the slurry rate.

At S806, controller 118 creates a normalized treating pressure channel that lies between zero and one. The normalized channel is now unitless and expresses each point as a percent of the maximum treating pressure. Similarly, controller 118 creates a normalized slurry volume channel that expresses each point as a percentage of the job pumped.

At S808, controller 118 generates an auxiliary a (0/1)-valued logical channel PT[t] (which may be referred to as the pressure test channel or PT channel) that is one precisely when the following three conditions hold (and zero otherwise):

The normalized slurry volume is less than $V_{max}^{pt}$;
The normalized treating pressure is greater than $P_{min}^{pt}$; and
The slurry rate is less than $R_{max}^{pt}$.

Where $V_{max}^{pt}$, $P_{min}^{pt}$, and $R_{max}^{pt}$ are configurable thresholds determined based on experiments and/or empirical studies.

At S810, controller 118 identifies pressure tests. In one example, controller 118 identifies contiguous blocks of time where the PT signal of PT channel is equal to one (pressure tests) can then be identified and then removed or merged according to their durations. This step can be accomplished using pure signal processing filters. Finally, the last time of the final PT block will be used to further reduce/refine the potential stage intervals identified per S206.

Figure 9:
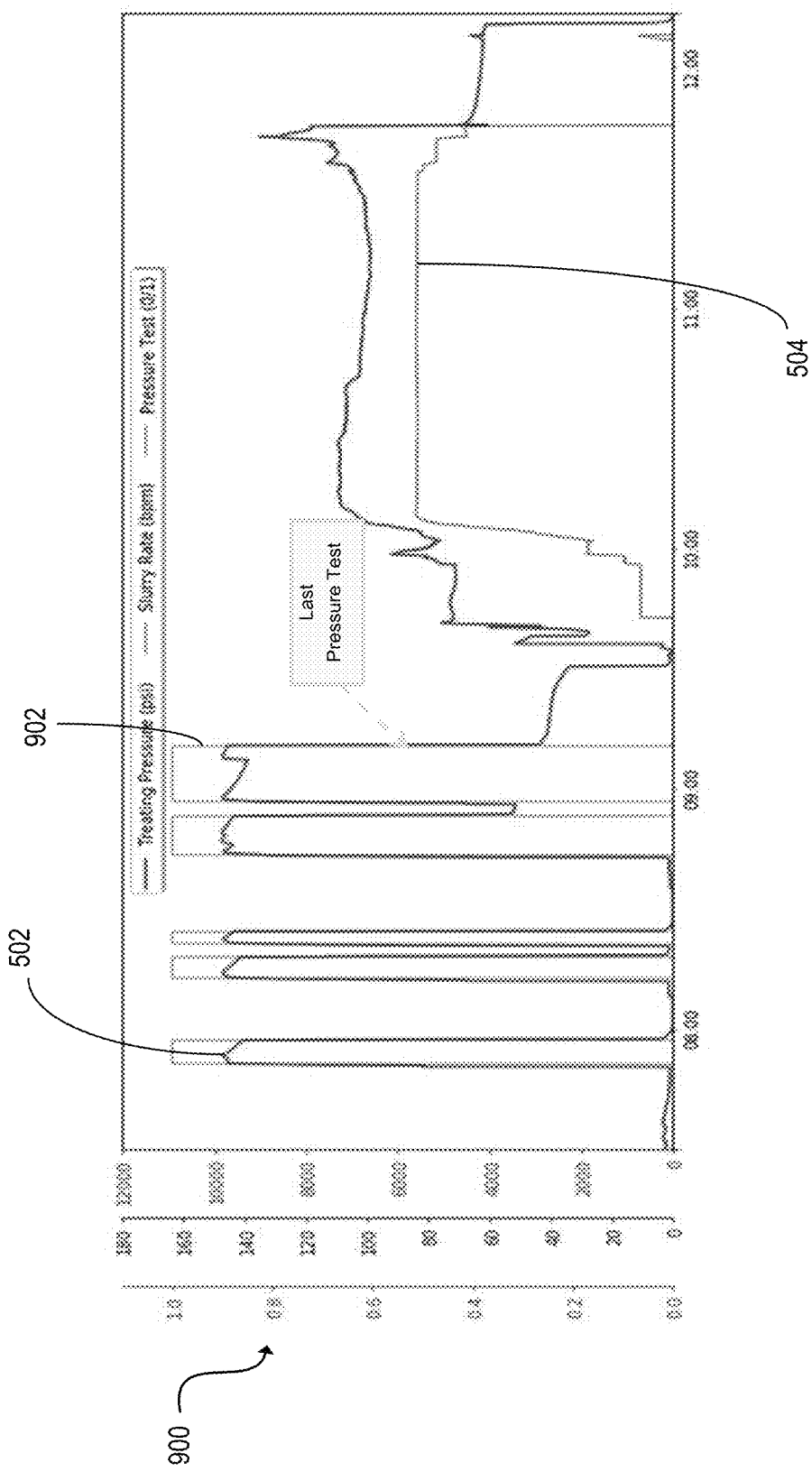
FIG. 9 illustrates an output of detecting pressure tests per process of FIG. 8, according to one aspect of the present disclosure.

FIG. 9 illustrates an output of detecting pressure tests per process of FIG. 8, according to one aspect of the present disclosure.

Graph 900 of FIG. 9 illustrates treating pressure channel 502 and slurry rate channel 504 as previously described overlaid with auxiliary PT channel 902 generated per process of FIG. 8. FIG. 9 illustrates multiple detected pressure tests, with each such test being indicated by non-zero periods of PT signal of PT channel 902. Falling edge of last non-zero period of PT signal, as indicated, will be taken as indication of the last PT test. The last detected PT test is indicative of the start of a new stage and hence can be used by controller 118 at S208 to further refine the fracturing stages estimated/approximated per S206.

Referring back to process of FIG. 2 and with fracturing stages approximated per S206 and refined per S208, then at S210, controller 118 determines a start time of each approximated stage. Process of determining a stage start time will be described with reference to FIG. 10.

Figure 10:
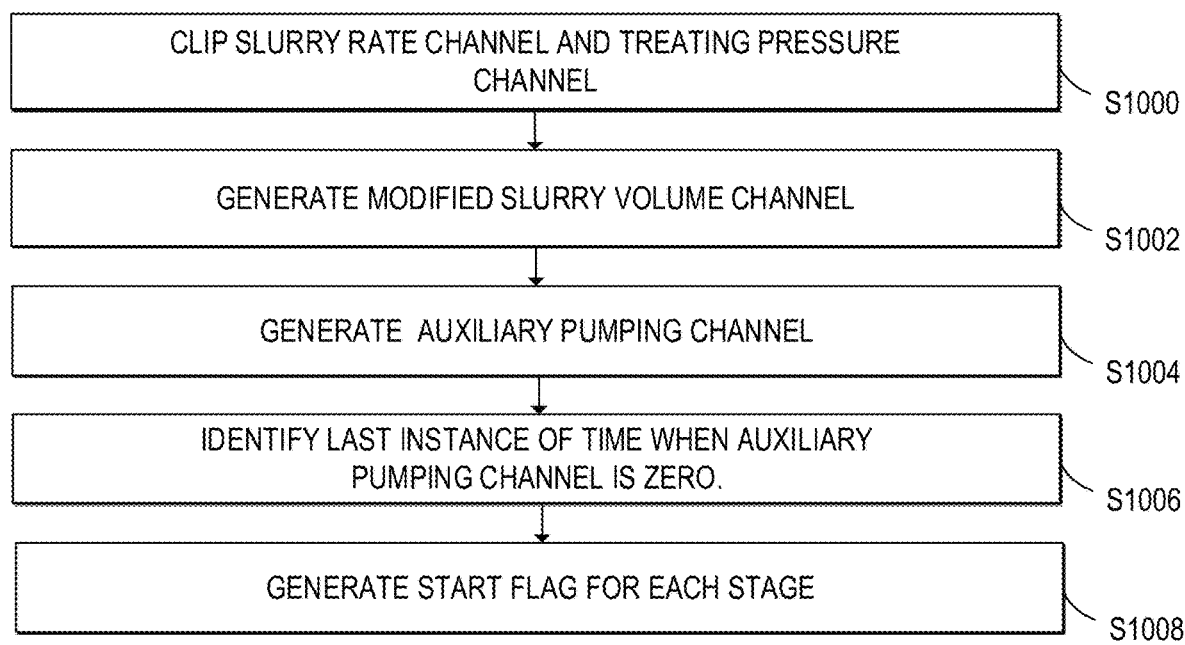
FIG. 10 is a flow chart of a process for determining a start time of a fracturing stage, according to one aspect of the present disclosure.

FIG. 10 is a flow chart of a process for determining a start time of a fracturing stage, according to one aspect of the present disclosure.

At S1000, controller 118 clips slurry rate and treating pressure channels. Specifically, controller 118 clips the slurry rate channel at $R_{clip}^{apx}$ and sets treating pressure channel to zero whenever the treating pressure is below $P_{rclip}^{apx}$. The pressure condition is used to ignore periods where a positive slurry rate is registered but the treating pressure is too low for pumping operations.

At S1002, modified slurry rate channel (as a result of clipping at S1000) is then used to generate a (modified) auxiliary slurry volume channel. These derived channels are not used to report stage statistics but instead are used to robustly identify how far into a stage each time is. In one example, a flag identifying a start time of a stage (start flag) should be placed before $V_{start}^{apx}$ barrels have been pumped as determined by the modified slurry volume channel. In one example, this calibrated volume threshold can be overridden to respect specific business or operating rules.

At S1004, controller 118 generates an auxiliary pumping channel to identify time intervals where the stage is clearly being pumped. This is accomplished by creating a pumping (0/1)-valued channel that is one when the slurry rate is greater than $R_{min}^{apx}$ and the treating pressure is greater than $P_{min}^{apx}$.

At S1006, controller 118 identifies the last time $T_{base}^{start}$ that the auxiliary pumping channel is zero. Intuitively, this corresponds to the last time that pumping operations are interrupted within the volume limited window. The time $T_{base}^{start}$ is the approximate starting time of a stage and will be used as the base point for a more refined identification of the starting time. For multiple stages, multiple corresponding $T_{base}^{start}$ may be identified by controller 118.

At S1008, controller 118 places a flag (a start flag) at each identified $T_{base}^{start}$ Referring back to FIG. 2, at S212, controller 118 determines an end time of each approximated stage. Process of determining an end time will be described with reference to FIG. 11. In one example, the last time there is a history of "sustained" high treating pressure with a positive slurry rate, may be considered an end time of a given fracturing stage.

Figure 11:
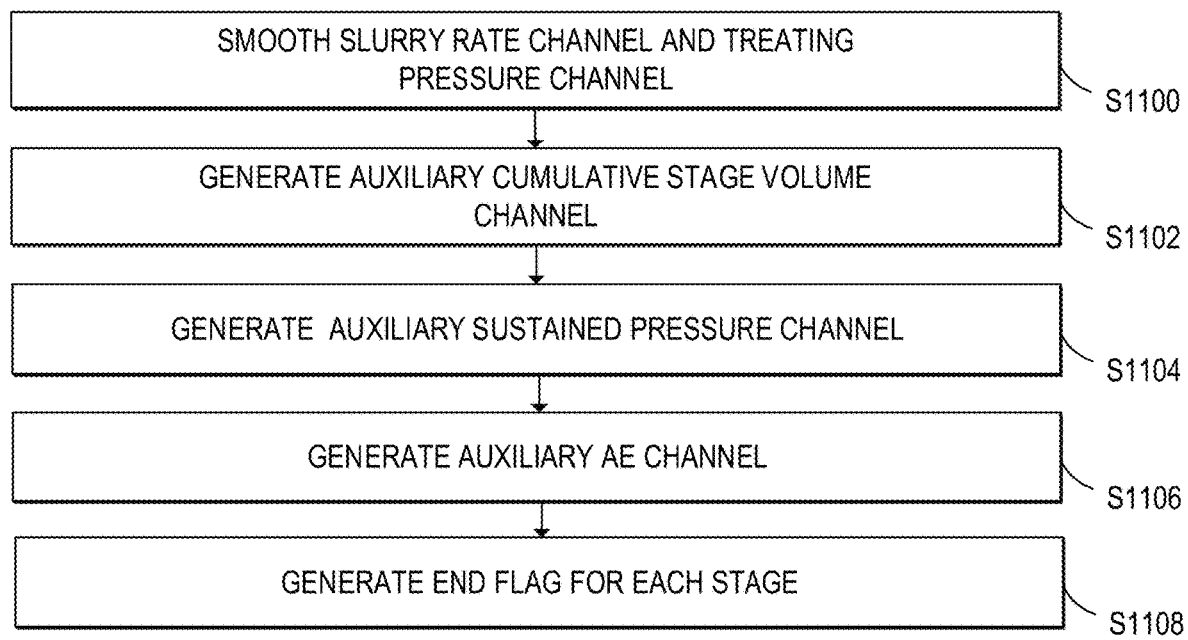
FIG. 11 is a flow chart of a process for determining an end time of a fracturing stage, according to one aspect of the present disclosure.

FIG. 11 is a flow chart of a process for determining an end time of a fracturing stage, according to one aspect of the present disclosure.

At S1100, controller 118 smooths both the slurry rate and treating pressure channels using short window median smoothing.

At S1102, controller 118 generates an auxiliary cumulative stage volume channel (used to identify stage progress) using the smoothed slurry rate channel.

At S1104, controller 118 generates an auxiliary sustained pressure channel SP[t] using a trailing $T^{spt}$ second minimum filter, per Equation (2) below (Eq. 2)

$$SP[t] = \min[\text{pressure}[\tau] | t - T^{spt} \leq \tau \leq t] \quad \text{Equation (2)}$$

At S1106, controller 118 generates a (0/1)-valued channel Approximate End (AE[t]) that is equal to one when the following three conditions hold simultaneously:

The time is later than a previously identified start time at S210.
The slurry volume is greater than $V_{min}^{end}$;
The smoothed slurry rate is greater than $R_{min}^{end}$; and
The sustained treating pressure SP[t] is greater than $SP_{min}^{end}$.

The parameter $V_{min}^{end}$ is the maximum of a calibrated static value (shortest valid stage in the training data) and a dynamic value (a calibrated fraction of the total slurry volume).

At S1108, controller 118 generates a flag (an end flag) indicating the approximate end time of a stage, which is placed at the last time the auxiliary AE channel is equal to one. It could be the case that the pumps have not been shut down in the signal seen so far and so the flag is clearly placed too early.

Referring back to FIG. 2, at S214, controller 118 refines (updates) the determined start time of each stage. Refining a stage start time may be the same as adjusting a corresponding start flag generated per S1008, as described with reference to FIG. 10.

For updating each determined start time, controller 118 may perform the following process.

To refine the placement of the start flag, controller 118 creates a search neighborhood around each start flag. Then controller 118 quantizes the slurry rate, which was rounded (quantized) per Equation 1 and then finds the last time the quantized/rounded slurry rate achieves its minimum value in a corresponding search neighborhood. Controller 118 then searches for the last time the slurry rate is approximately at its minimum value.

Figure 12:
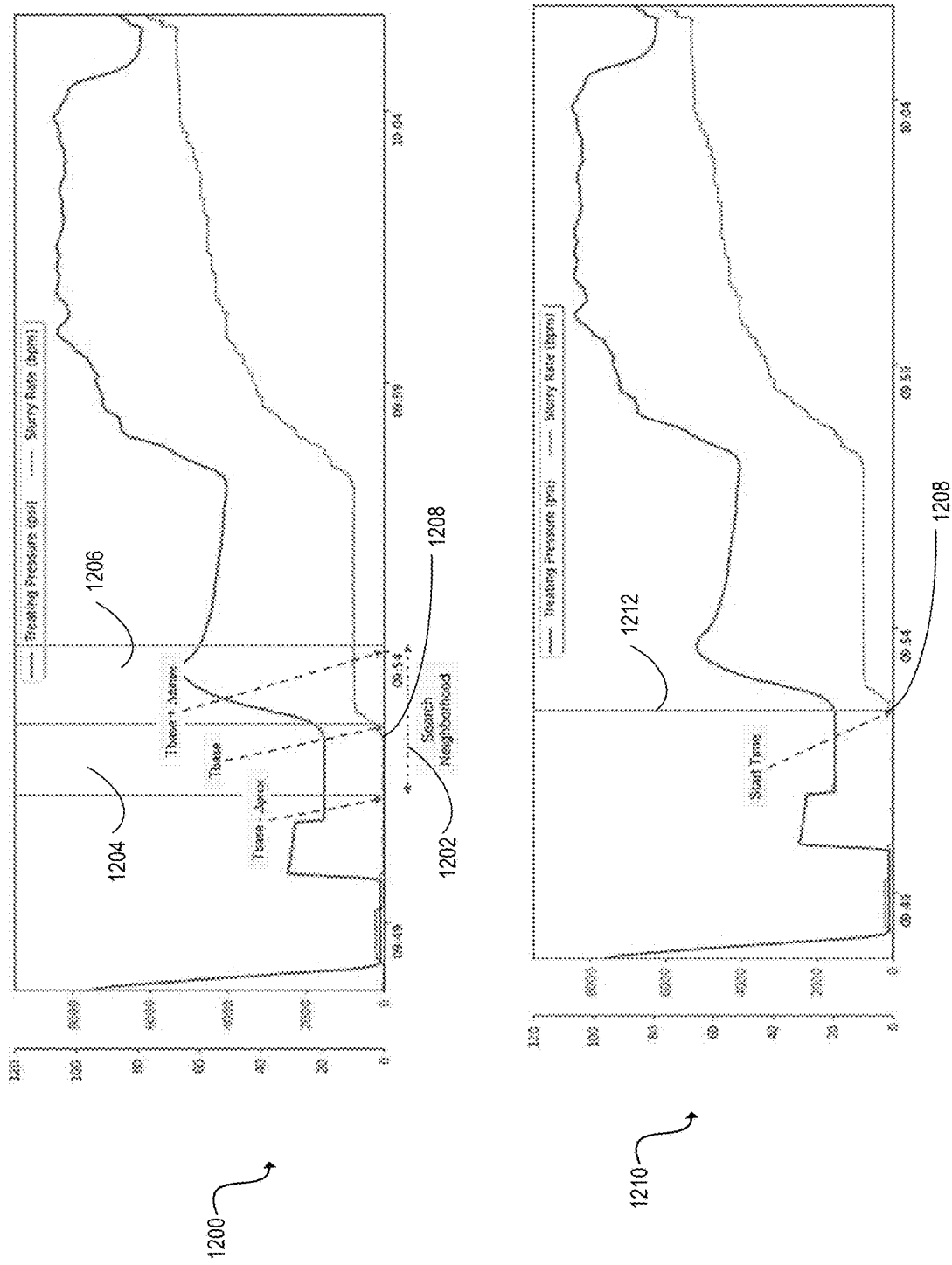
FIG. 12 illustrates an example output of start time refinement, according to one aspect of the present disclosure.

FIG. 12 illustrates an example output of start time refinement, according to one aspect of the present disclosure.

Graph 1200 shows an example search neighborhood 1202, which is quantized (split into two sections 1204 and 1206. As can be seen from graph 1200, the last time slurry rate achieves its minimum value is at point 1208. As shown in graph 1210, start flag 1212 is adjusted to align with point 1208 thus reflecting an updated/refined start time of an example stage.

Referring back to FIG. 2 and similar to the process at S214, controller 118 refines (updates) the determined end time of each stage at S216. Refining an end time may be the same as adjusting a corresponding end flag generated per S1108, as described with reference to FIG. 11.

For updating each determined end time, controller 118 may perform the following process.

To refine the placement of the end flag, controller 118 creates a search neighborhood around each end flag. Then controller 118 quantizes the slurry rate, which was rounded (quantized) per Equation 1 and then finds the earliest time the quantized/rounded slurry rate achieves its minimum value in a corresponding search neighborhood. In one example, such minimum slurry rate value is within a configurable threshold of zero (as close to zero as possible or zero). This addresses the case where the search neighborhood does not yet contain evidence that the pumps have been shut down. Controller 118 then searches for the earliest time the slurry rate is approximately at its minimum value near the end of a corresponding stage.

Figure 13:
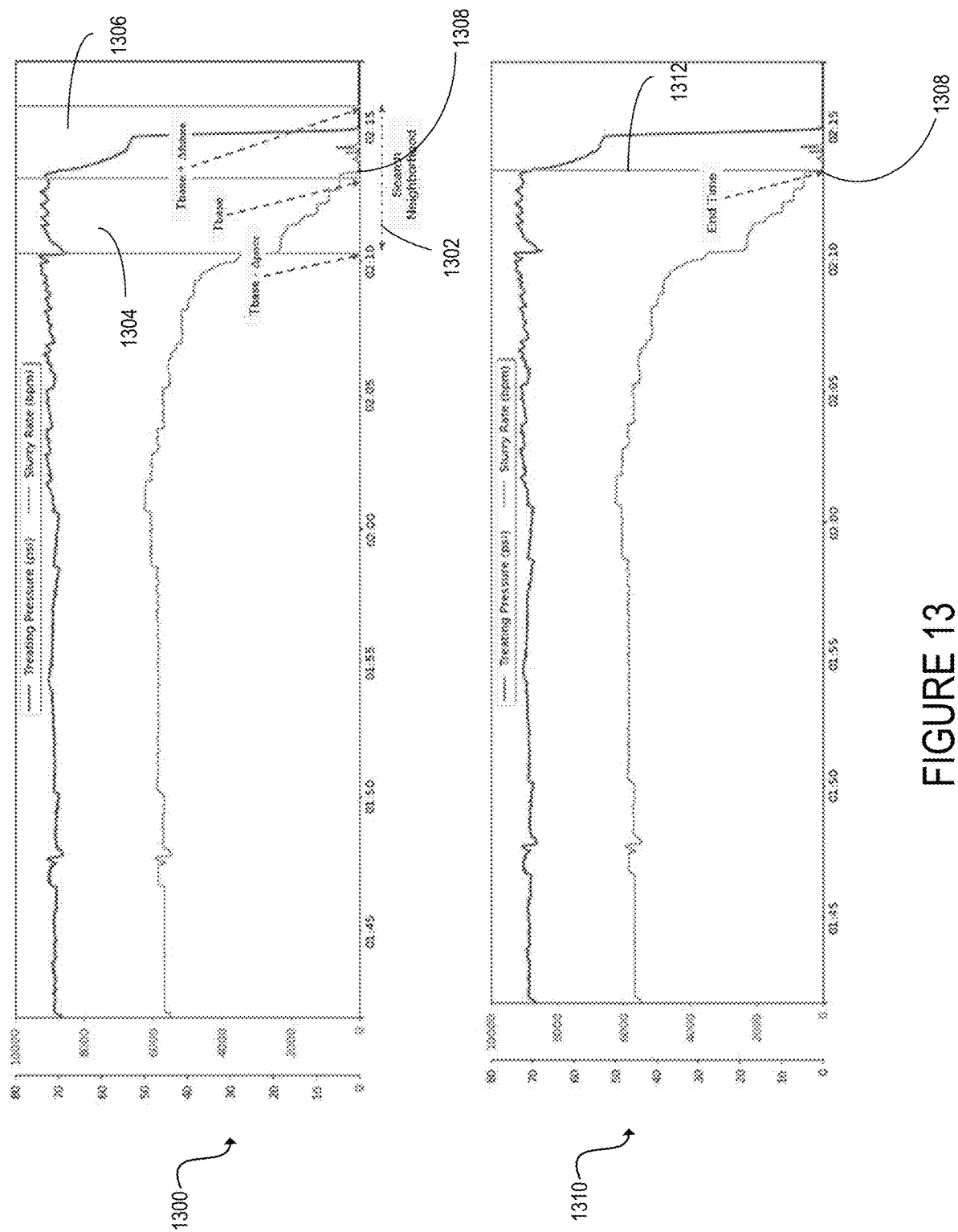
FIG. 13 illustrates an example output of end time refinement, according to one aspect of the present disclosure.

FIG. 13 illustrates an example output of end time refinement, according to one aspect of the present disclosure.

Graph 1300 shows an example search neighborhood 1302, which is quantized (split into two sections 1304 and 1306. As can be seen from graph 1300, the earliest time slurry rate achieves its minimum value is at point 1308. As shown in graph 1310, end flag 1312 is adjusted to align with point 1308 thus reflecting an updated/refined end time of an example stage.

Process of stage start time and end time determination described above with reference to FIGS. 2-13 may be applied to train a machine learning algorithm for predicting stage start and end times and modifications thereof as new data comes in. By utilizing thousands sets of in-field collected data and determining/calibrating various thresholds for stage start/end detection, as described above with reference to FIG. 2-13, a model is trained, which can then take incoming in-field collected data as input and provide predicted stage start and end times as outputs. This process is described with reference to FIG. 14. Controller 118 may be such trained model.

Figure 14:
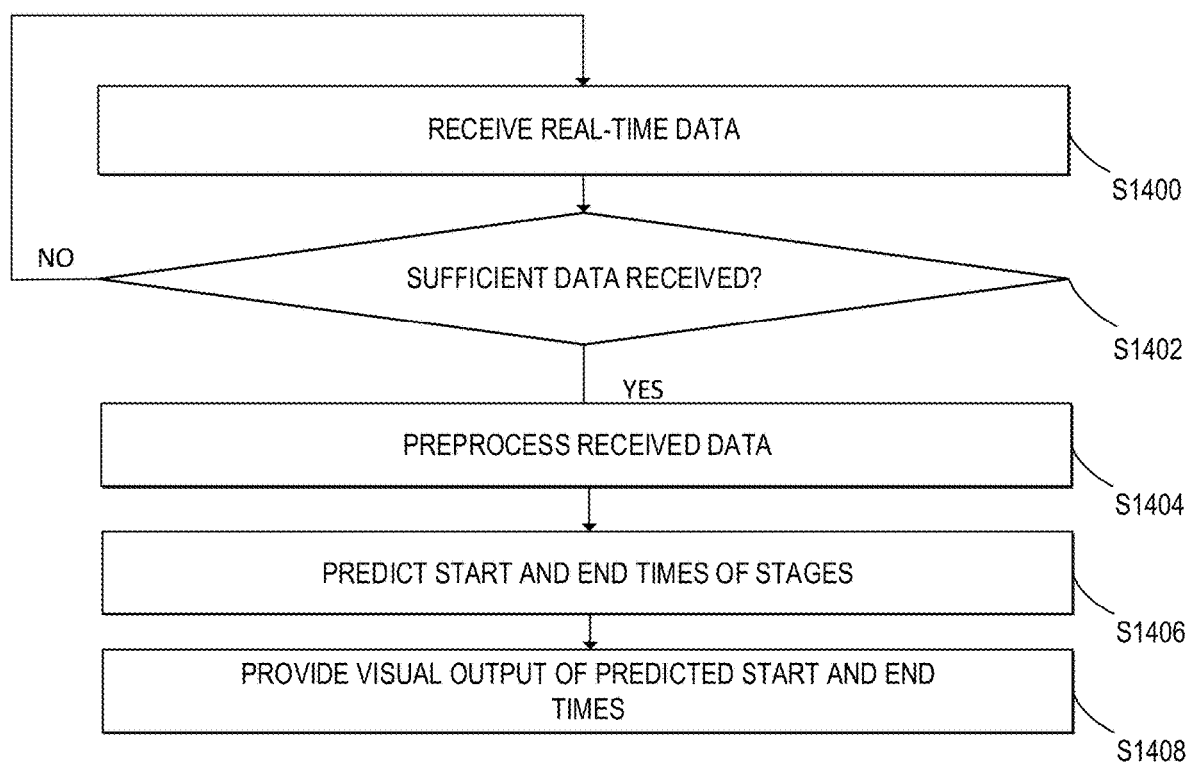
FIG. 14 is a flow chart of a real-time process for predicting stage start and end times using a machine learning model trained per process of FIGS. 2-13, according to one aspect of the present disclosure.

FIG. 14 is a flow chart of a real-time process for predicting stage start and end times using a machine learning model trained per process of FIGS. 2-13, according to one aspect of the present disclosure.

FIG. 14 will be described from the perspective of Controller 118 trained per processes of FIGS. 2-13. In one example, process of FIG. 14 may be implemented periodically with a configurable periodicity (e.g., a few seconds, every minute, every five minutes, every 10 minutes, every hour, every day, etc.)

At S1400, controller 118 receives real-time streaming data collected in field using various sensors, as described above with reference to FIG. 1. Such data are streamed to controller 118 via one or more processing systems such as processing system 114 of FIG. 1.

At S1402, trained controller 118 determines if sufficient real-time data are streamed in. Such sufficiency may be determined using a threshold time that is a configurable parameter. For example, such threshold may be set to tens of seconds, several minutes, a few hours, etc. In other words, at S1402, trained controller 118 determines how far back to look for into the streamed data for updating/determining stage start/end time predictions.

If not, the process reverts back to S1400 and controller 118 monitors incoming streaming data until the threshold is met.

Then at S1404 and once sufficient real-time data are streamed in, trained controller 118 preprocesses the data in the same manner as described above with reference to S202. In one example S1404 may be performed before S1402. In other words, order of performing S1402 and S1404 may be switched.

Then at S1406, controller 118 applies a detection process (as described above with reference to FIGS. 2-13) to predict start and end times of a fracturing stage.

At S1408, controller 118 outputs a visual/graphical representation of the predicted start and end times. Such visual representation will be described with reference to FIG. 15.

Figure 15:
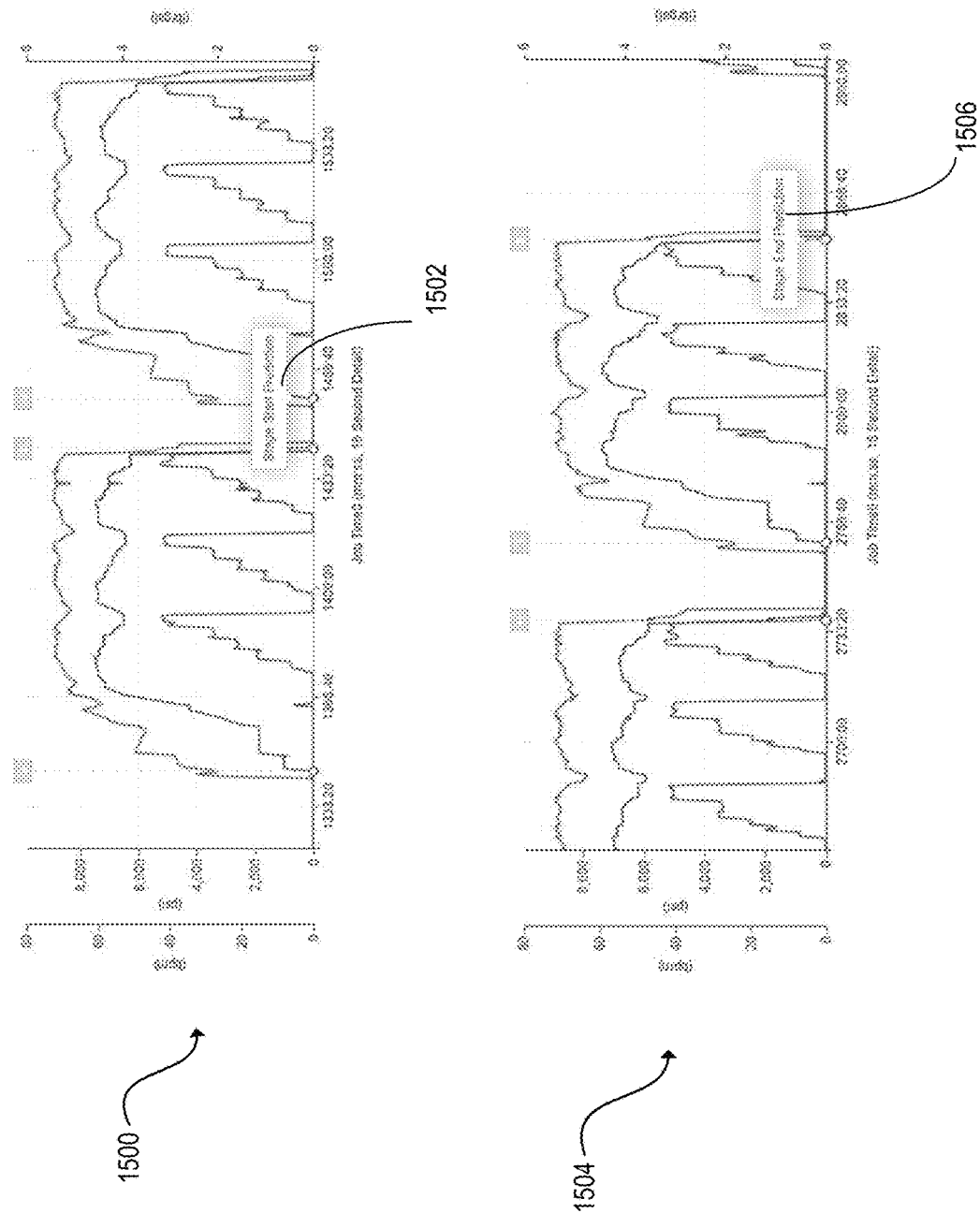
FIG. 15 illustrates an example output of predicted start and end times of a fracturing stage, according to one aspect of the present disclosure.

FIG. 15 illustrates an example output of predicted start and end times of a fracturing stage, according to one aspect of the present disclosure.

Graph 1500 is one screenshot of the output with stage start time 1502 predicted. This is followed by graph 1504 which is a subsequent output with stage end time 1506 predicted.

As noted earlier above, the processes of identifying fracturing stages and associated start and end times of each stage is a real-time analysis implemented using a cloud based analysis tool. Interaction with such cloud based analysis tool (executed by controller 118) may be enabled by a web-accessible portal on an end terminal such as a laptop, a desktop, a mobile device, etc. operated for example by a test engineer, a network operator, etc. Accordingly, various visual outputs of the processes described above and those that will be further described above may be output to such web-accessible portal for viewing, modification etc. The tool may provide various capabilities for an engineer/operator to interact with the visual outputs, change parameters and thresholds, provide commands to start, pause and/or terminate a real-time analysis process described herein, etc.

Figure 16:
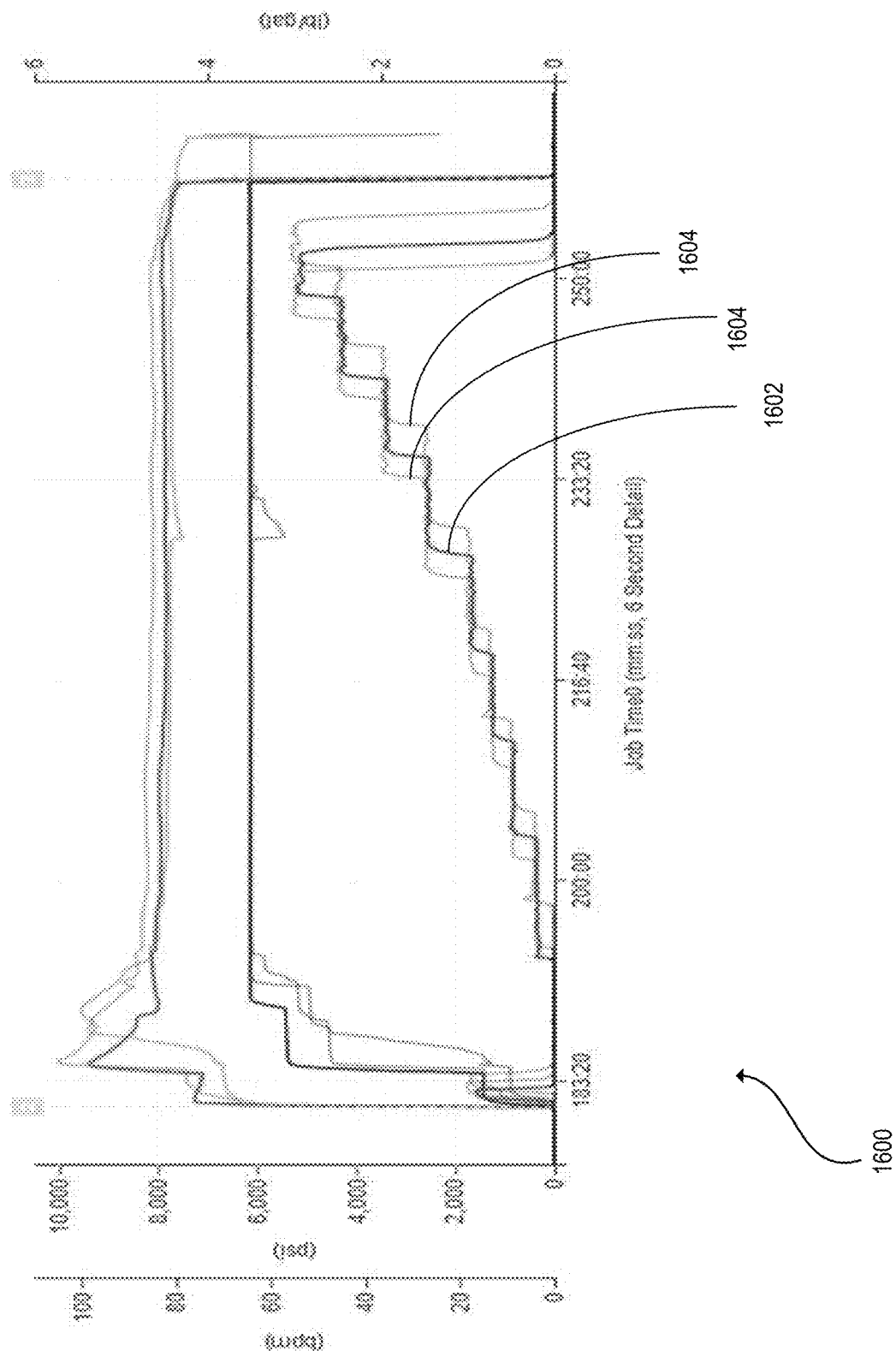
FIG. 16 is another example output of the process of FIG. 14, according to one aspect of the present disclosure.

FIG. 16 is another example output of the process of FIG. 14, according to one aspect of the present disclosure.

Process of FIG. 14 generates predictions every few seconds on average. The length of the streaming window analyzed by trained controller 118 and the frequency of the analysis can be modified to accommodate a variety of internet and streaming conditions. This approach provides a robust, automated, transparent and extremely performant model that easily accommodates operating constraints. This, in turn, enables real-time reporting of operational metrics and more advanced analysis, such as comparing stages aligned on events. Graph 1600 of FIG. 16 provides real-time capability of comparing a current stage being fractured, labeled 1602 with previous stages labeled 1604.

As mentioned above, a utility and objective of having the capability to split stages and identify start and end times of fracturing stages in real-time is to allow for quick identification and addressing of problems and operational issues. One indication of operational issues is abnormal pressure changes. Abnormal pressure changes can be indicative of problems including, but not limited to, casing failures, plug slippages, and screen-outs. Addressing these early and in near real-time improves system efficiency and reduces operational costs.

With various example embodiments directed to stage splitting and prediction of start and end times of fracturing stages in real-time described above with reference to FIGS. 1-16, the disclosure now turns to utilizing a trained machine algorithm (implemented by controller 118 and/or another processing center) to detect abnormal pressure changes. By detecting either pressure increases or decreases, controller 118 can classify the changes as potential different types of events (e.g., a sharp pressure drops as a mechanical failure or a sharp pressure increase as a potential screen out, casing failure, etc.). This approach utilizes statistical analysis to correlate events that precede failures and provides insights through failure diagnostics. This root-cause analysis for pressure changes provides insight into causes for failures, and these diagnostics can inform improvements in pump schedules. When stages are inefficiently pumped, it is costly in the short-term (wasted proppant/fluid/chemicals) as well as the long-term (reduced well productivity). Understanding how operations are affected by design decisions can not only result in cost-savings but can also decrease the likelihood of failure.

Figure 17:
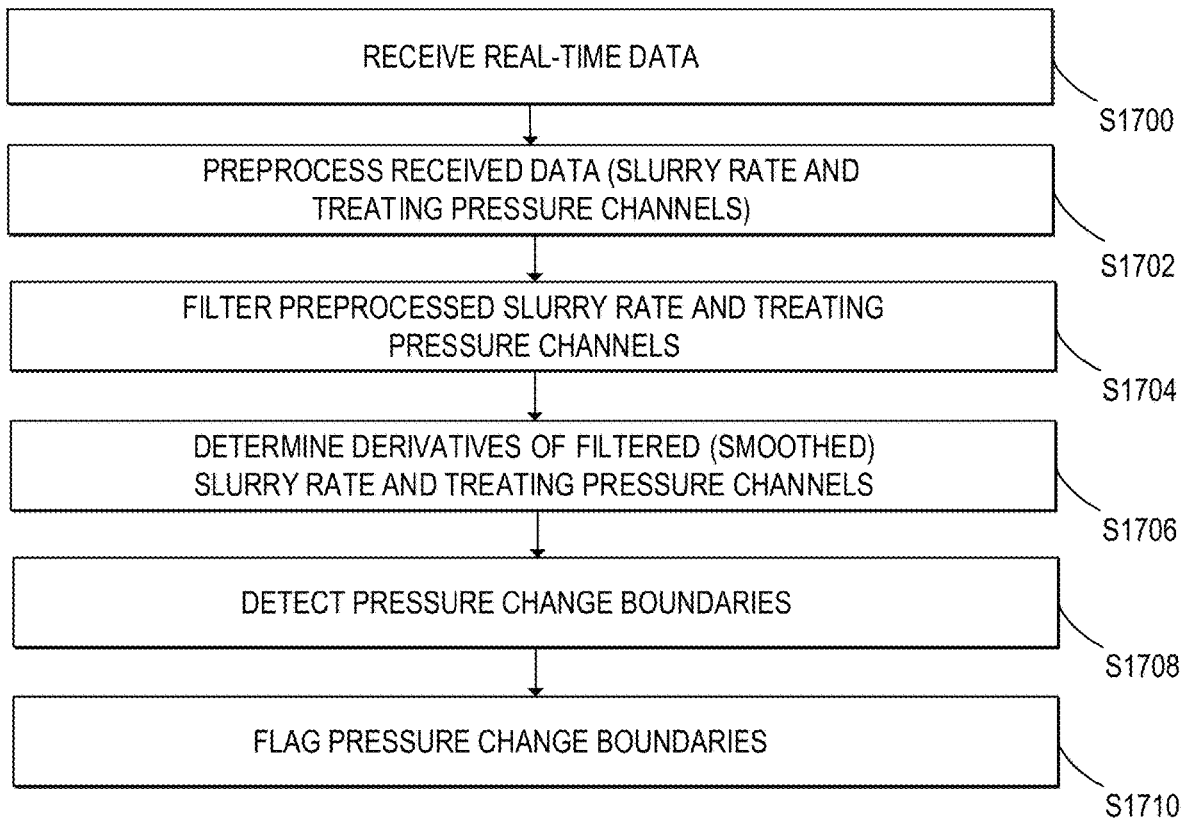
FIG. 17 is a flow chart of a process for detecting pressure changes, according to one aspect of the present disclosure.

FIG. 17 is a flow chart of a process for detecting pressure changes, according to one aspect of the present disclosure.

Similar to FIG. 2, process of FIG. 17 will be described from the perspective of controller 118.

At S1700, controller 118 receives real-time data collected in the field, as described above and in the same manner as described above with reference to S1400 of FIG. 14. In one example, received data are recorded at one-second intervals and saved in comma-separated (CSV) files. The raw one-second data includes multiple channels including, but not limited to, treating pressure, slurry rate, clean volume, and proppant concentration channels.

At S1702, controller 118 preprocesses the real-time data collected in the same manner as described above with reference to S1404 of FIG. 14.

Figure 18:
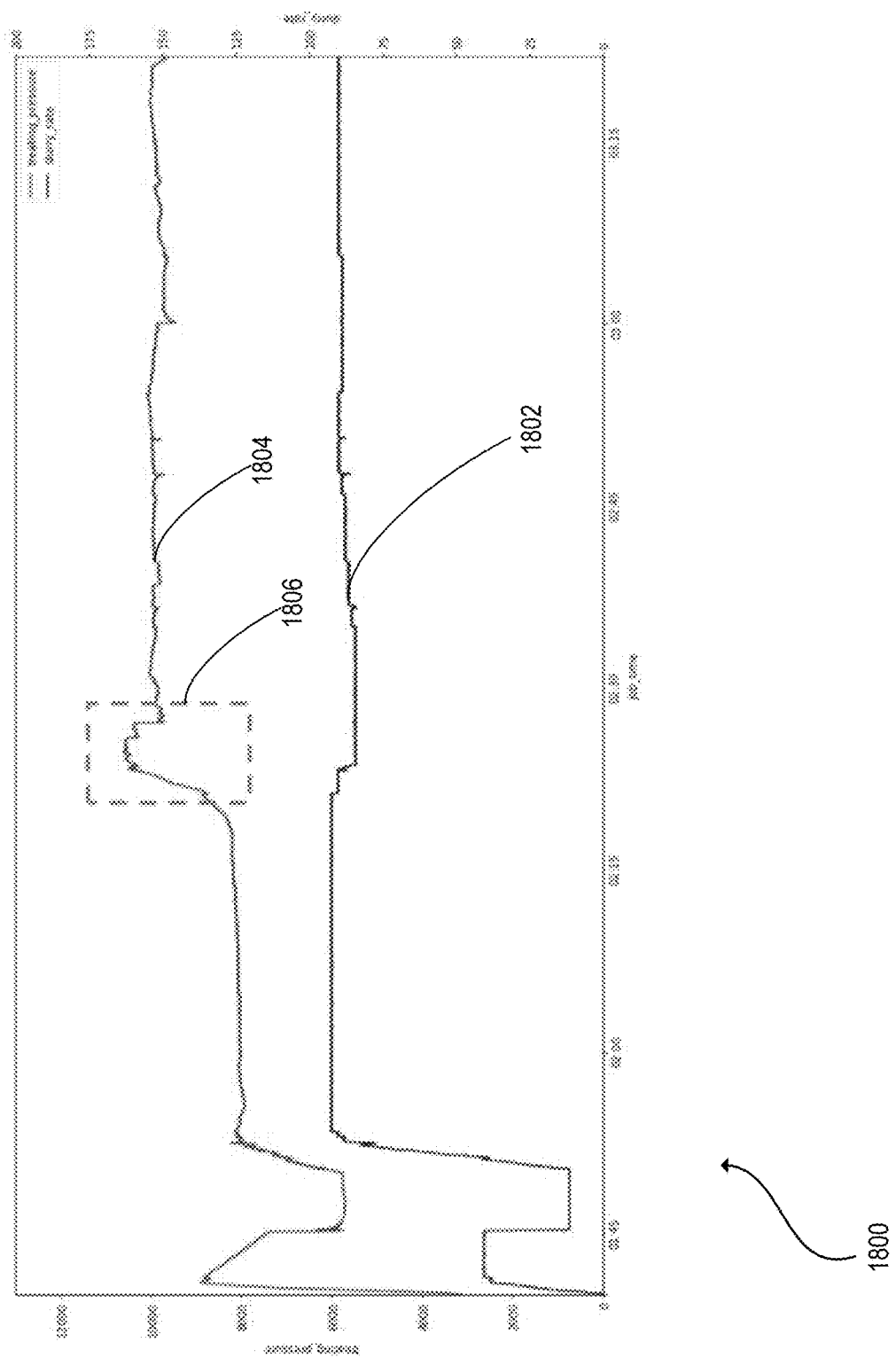
FIG. 18 is an example screenshot of preprocessed slurry rate and treating pressure channels with an abnormal pressure change to be detected, according to one aspect of the present disclosure.

FIG. 18 is an example screenshot of preprocessed slurry rate and treating pressure channels with an abnormal pressure change to be detected, according to one aspect of the present disclosure.

Graph 1800 illustrates slurry rate channel 1802, treating pressure channel 1804 and abnormal pressure change identified by box 1806 (which shows an example increase in pressure followed by an example decrease in pressure). The output of the method of FIG. 17 is to identify this abnormal pressure change.

At S1704, controller 118 filters (smooths) the preprocessed slurry rate and treating pressure channels. In one example, controller 118 applies a median filter to the slurry rate and treating pressure channels.

Figure 19:
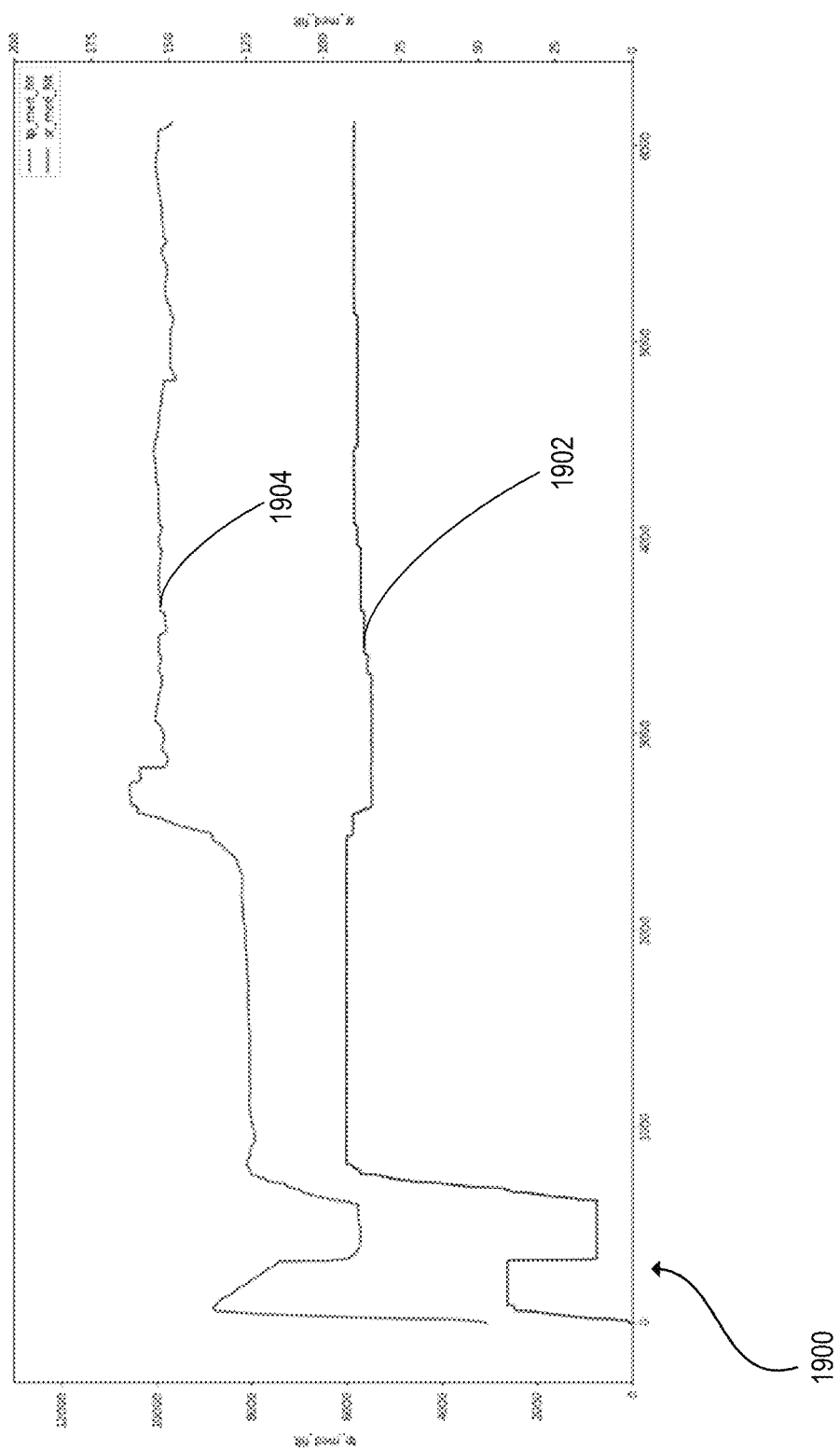
FIG. 19 illustrates the results of filter preprocessed slurry rate and treating pressure channels, according to one aspect of the present disclosure.

FIG. 19 illustrates the results of filter preprocessed slurry rate and treating pressure channels, according to one aspect of the present disclosure.

Graph 1900 illustrates smoothed slurry rate channel 1902 and smoothed treating pressure channel 1904.

At S1706, controller 118 determines a first derivative of the smoothed slurry rate channel and a first derivative of the smoothed treating pressure channel.

Figure 20:
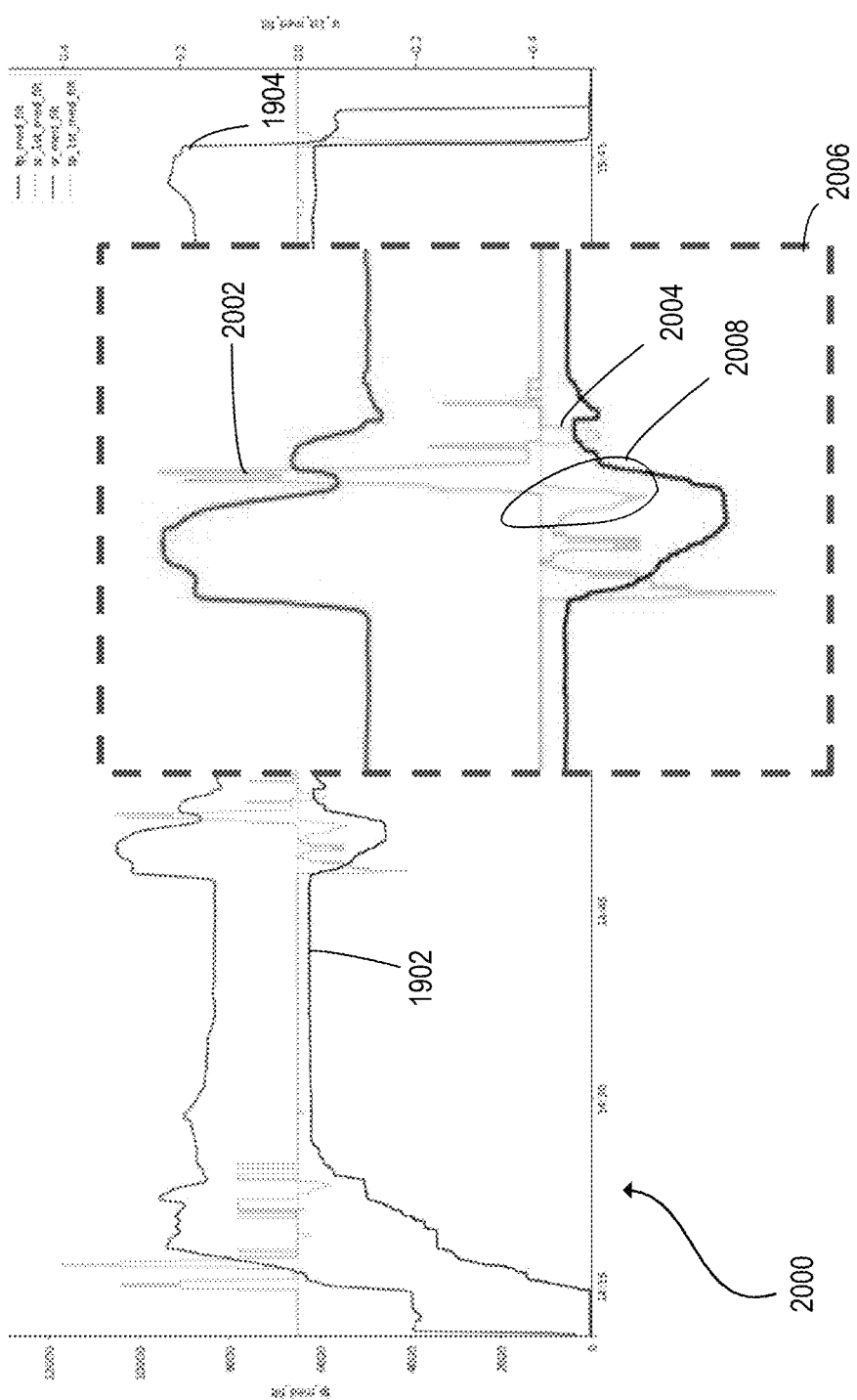
FIG. 20 illustrates the results of first derivative of smoothed slurry rate and first derivative of smoothed treating pressure channels, according to one aspect of the present disclosure.

FIG. 20 illustrates the results of first derivative of smoothed slurry rate and first derivative of smoothed treating pressure channels, according to one aspect of the present disclosure. Graph 2000 illustrates smoothed slurry rate channel 1902 and smoothed treating pressure channel 1904 as well as first derivative 2002 of smoothed slurry rate channel and first derivative 2004 of smoothed treating pressure channel. Box 2006 indicates an area of interest of abnormal pressure change to be identified based on the first derivatives 2002 and 2004. More specifically and as will be described, controller 118 will detect areas such as area 2008 for abnormal pressure changes.

At S1708, controller 118 determines boundaries (flags indicative of maximum and minimum pressure changes) of abnormal pressure changes. In one example, controller 118 finds areas where the first derivative of smoothed treating pressure channel decreases (or increases) sharply and the slurry rate is constant or increasing (indicated by areas where the first derivative of the smoothed slurry rate is >=0). Edges of these peaks are identified as initial boundaries of maximum and minimum pressure changes and are flagged at TPmax to TPmin (in a pressure drop case, maximum drop precedes minimum drop or TPmax precedes TPmin while in a pressure increase case, TPmin precedes TPmax). The difference between TPmax and TPmin is then determined as $\Delta P$ (psi) and difference in time from TP Max to TP Min is determined as $\Delta t$ (min). Controller 118 determines change in pressure as $\Delta P/\Delta t$ (psi/min).

Figure 21:
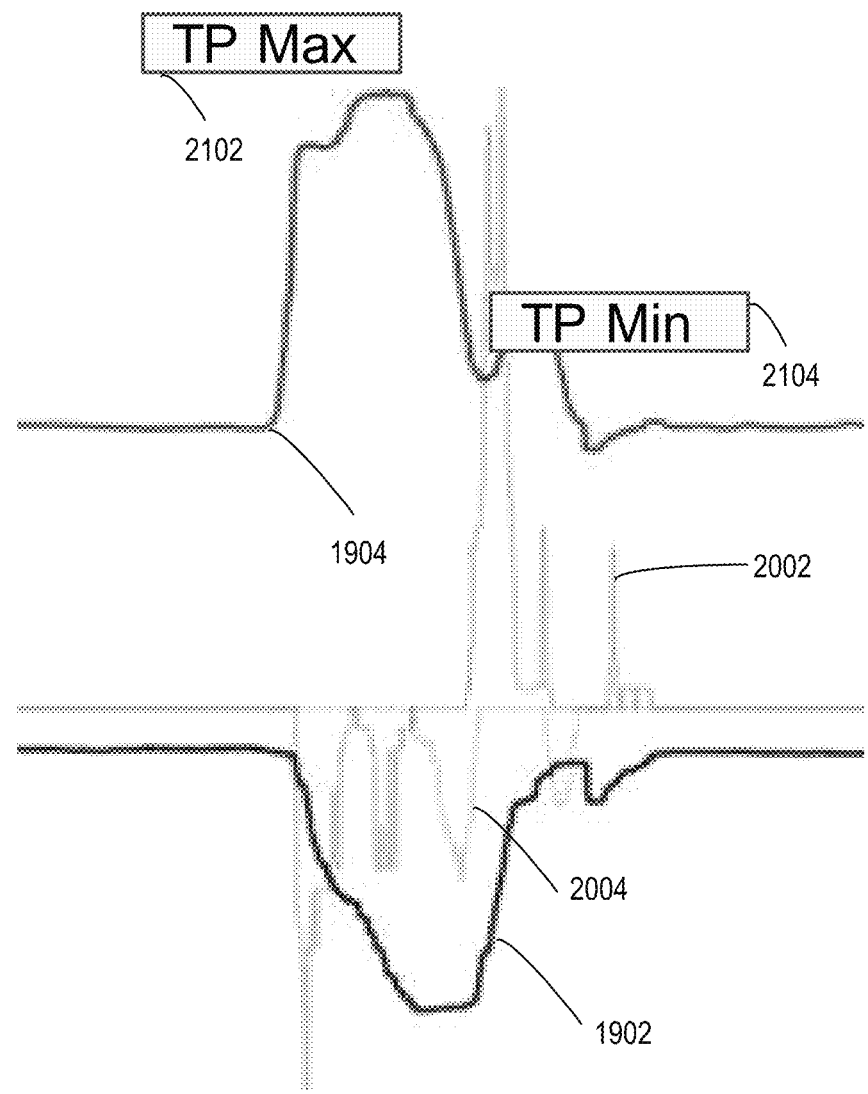
FIG. 21 illustrates an example of identified boundaries of a detected pressure change, according to one aspect of the present disclosure.

FIG. 21 illustrates an example of identified boundaries of a detected pressure change, according to one aspect of the present disclosure.

Graph 2100, in addition to smoothed slurry rate channel 1902, smoothed treating pressure channel 1904, first derivative 2002 of smoothed slurry rate channel 1902 and first derivative 2004 of smoothed treating pressure channel 1904, illustrates example TPmax 2102 and TPmin 2104 as identified per S1708.

Process of S1708 may identify many such pressure changes and hence corresponding TPmax and TPmin boundaries.

Figure 22:
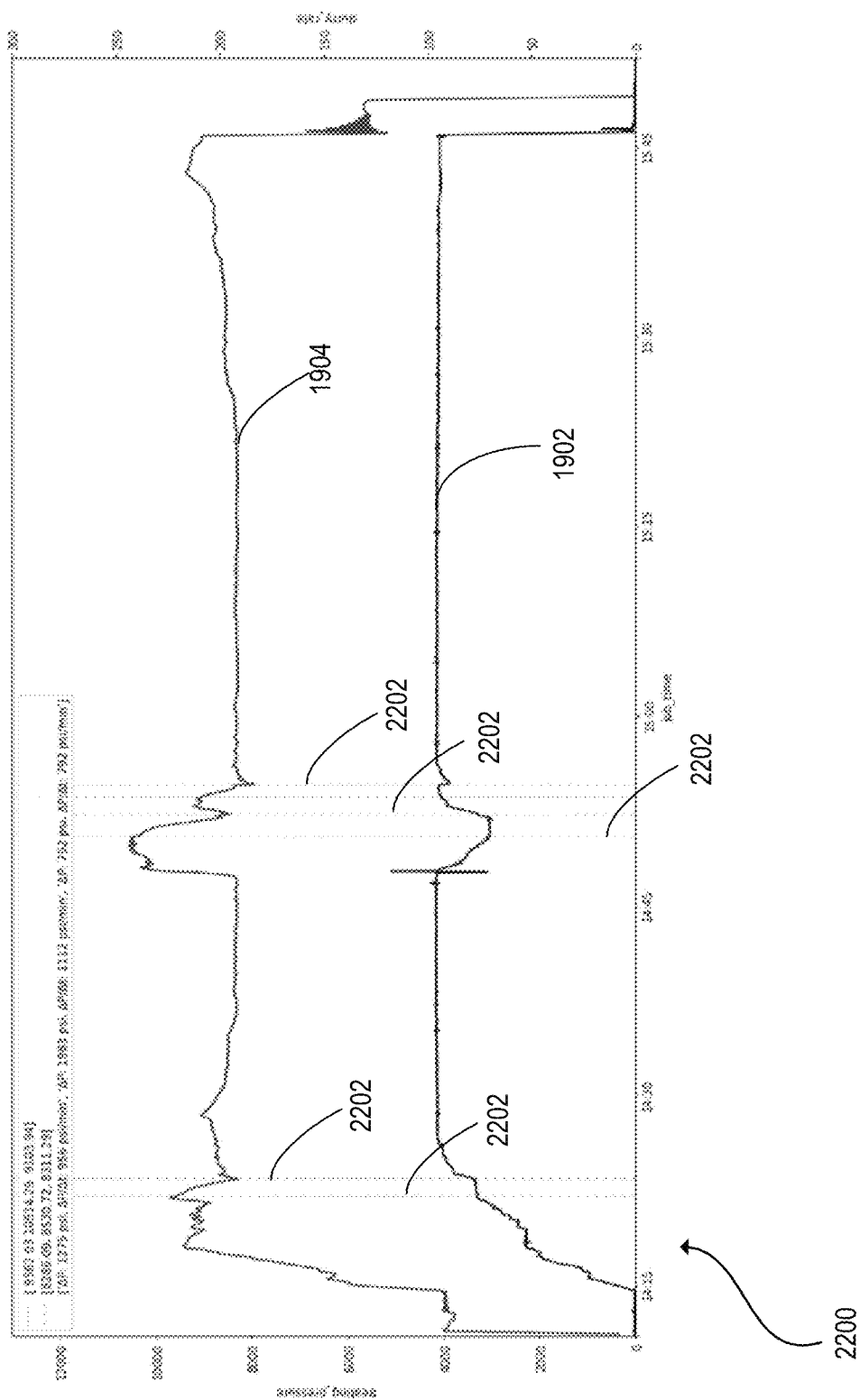
FIG. 22 illustrates an example output of flagged pressure change boundaries, according to one aspect of the present disclosure.

FIG. 22 illustrates an example output of flagged pressure change boundaries, according to one aspect of the present disclosure.

As shown, graph 2200, in addition to smoothed slurry rate channel 1902 and smoothed treating pressure channel 1904, illustrates multiple flags 2202 indicative of TPmax and TPmin boundaries.

In one example, each stage may have many boundary flags placed thereon as shown in FIG. 22, which are then refined further by searching +/−t seconds (e.g., +/−15 seconds) from each flag to find the maximum (for a TP Max flag) or a minimum (for the associated TP min flag). t can be any integer equal to or greater than 1.

At S1710, controller 118 flags detected pressure change boundaries.

Figure 23:
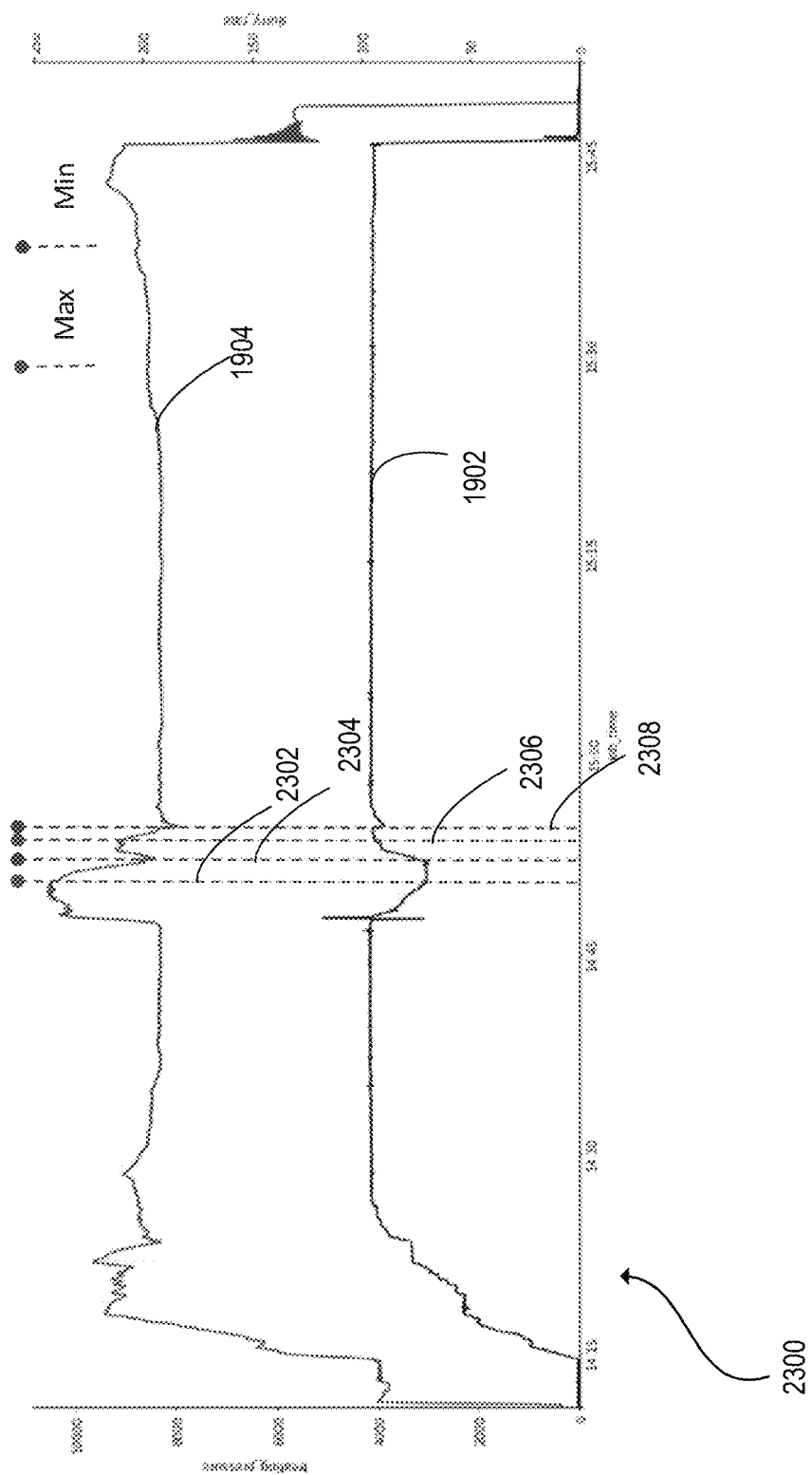
FIG. 23 illustrates another example output of flagged boundaries of maximum and minimum pressure changes across an entire fracturing job, according to one aspect of the present disclosure.

FIG. 23 illustrates another example output of flagged boundaries of maximum and minimum pressure changes across an entire fracturing job, according to one aspect of the present disclosure.

Example output 2300 may be displayed on a web portal accessed via a computer, a mobile device, etc. Output (graph) 2300 shows two example pairs of maximum-minimum pressure change flags. One pair is maximum flag 2302 followed by minimum flag 2304 while the second pair is maximum flag 2306 followed by minimum flag 2308 across smoothed slurry rate channel 1902 and smoothed treating pressure channel 1904. While graph 2300 shows two example pairs, there may be more or less detected pairs across a job that are indicative of abnormal pressure changes.

In one example, boundary flags are further refined by creating a minimum threshold pressure and rate of pressure change that is considered "abnormal." What is considered abnormal may be based on a configurable parameter determined based on experiments and/or empirical studies. This prevents small pressure changes that can be attributed to sensor noise or pump deviations from being flagged as boundaries of pressure change. Flags that occur within a certain time of the start and end of a stage (as detected per process of FIG. 14) may also be discarded as pump tests (at the beginning of a stage). Also, pump down tests (at the end of a stage) also exhibit similar pressure behavior which are not considered abnormal pressure changes.

In another aspect of the present disclosure and after performing the stage splitting and predicting start and end times of each stage, per processes described with reference to FIGS. 2-16, controller 118 may also perform a process for detecting Step-Down Test (SDT) during each stage.

The Step-Down Test (SDT) detection includes subsetting a single fracturing stage time series data set to the first 50 minutes of data (selecting a subset of data), removing all slurry rate (SR) values equal or close to zero and finding job time (JT) values where the slurry rate increases from zero to higher values (more than a configurable threshold value) and decreases from higher values to zero. A data frame between job times are then created and it is determined if the average slurry rate is greater than a threshold and if the bottomhole proppant concentration (BHPC) average is close to zero. Therefore, a check is conducted to determine if the slurry rate at the last n seconds (e.g., 450 seconds) of the step rate test drops almost vertically to zero or if it steps down to zero. On the step down to zero cases, edges of the treating pressure (TP) steps are identified and the difference in pressure values from step edge to step edge are calculated. n can be any integer equal to or greater than 1. The process will be further described below.

Figure 24:
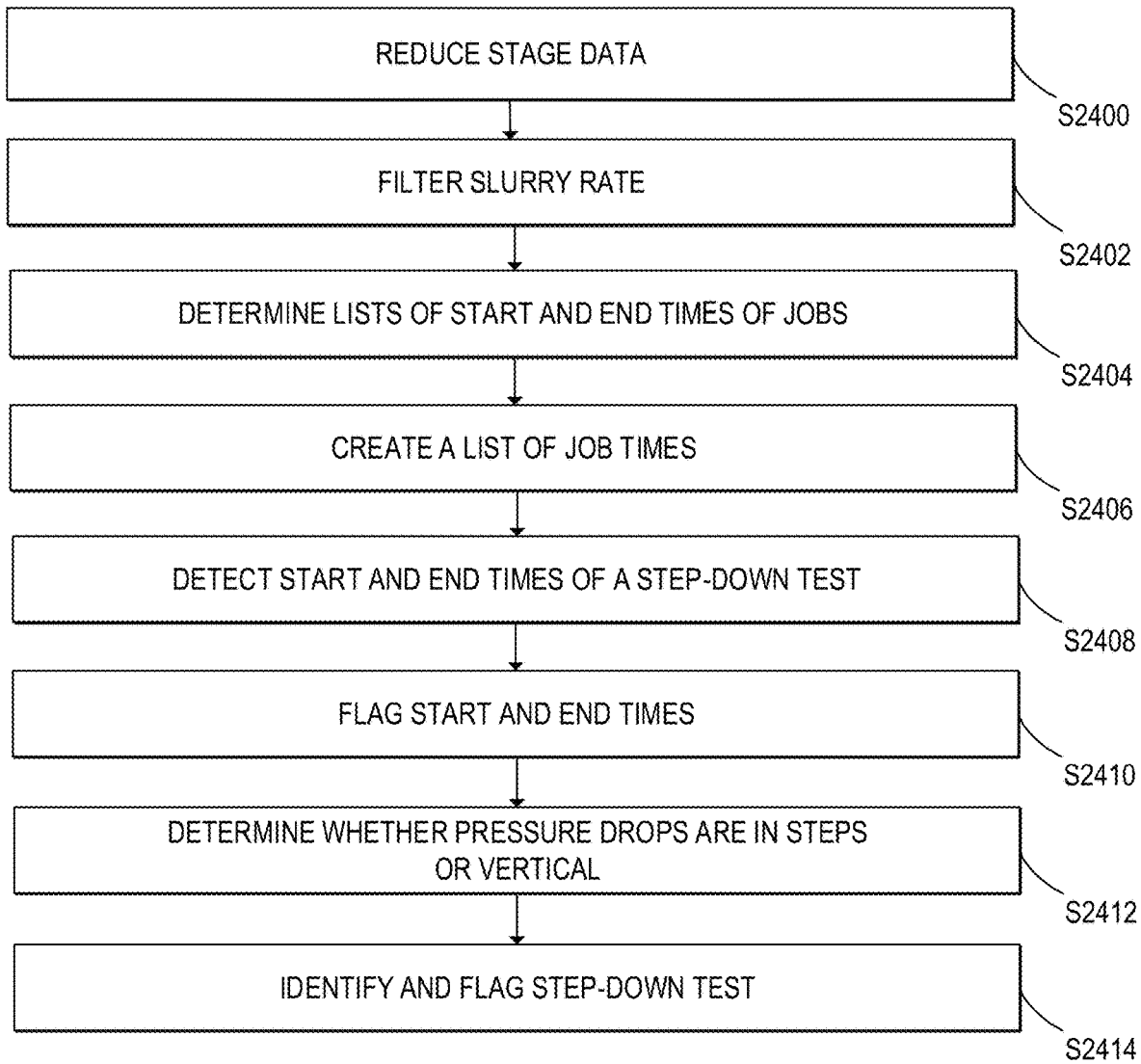
FIG. 24 is a flow chart of a process for detecting Step-Down Tests, according to one aspect of the present disclosure.

FIG. 24 is a flow chart of a process for detecting Step-Down Tests, according to one aspect of the present disclosure. FIG. 24 will also be described from the perspective of controller 118 of FIG. 1.

At S2400, controller 118 reduces data of a stage to first m minutes (e.g., 50 minutes) of the stage and determines the first derivative of the slurry rate (sr_1st), which is a new auxiliary data channel. m can be any integer equal to or greater than 1.

At S2402, controller 118 filters out slurry rate values lower than a threshold (e.g., 0.4 bpm).

At S2404, controller 118 determines a list of start times and a list of end times for jobs. In doing so, controller 118 determines the difference between index values and tags the location where the slurry rate starts increasing from zero and where the slurry rate starts decreasing to almost zero with one's and negative one's respectively. The first job time value of the end list should be greater than the first value of the start list.

At S2406, controller 118 creates a list of job times with job time start and end values and sorts the job time values. Controller 118 creates small data sets with the values from the start and end list keeping the job time start and end values where the average rate is greater than a threshold (e.g., 10 bpm).

At S2408, controller 118 detects start and end values of a SDT. In doing so, controller 118 determines if the average BHPC is less than a threshold (e.g., 0.1) to make sure acid is filtered out which will be the start and end values of the Step Down Test, pending that the decrease in pressure before the end job time is not vertical.

At S2410, controller 118 outputs flags corresponding to detected start and end values of a SDT.

Figure 25:
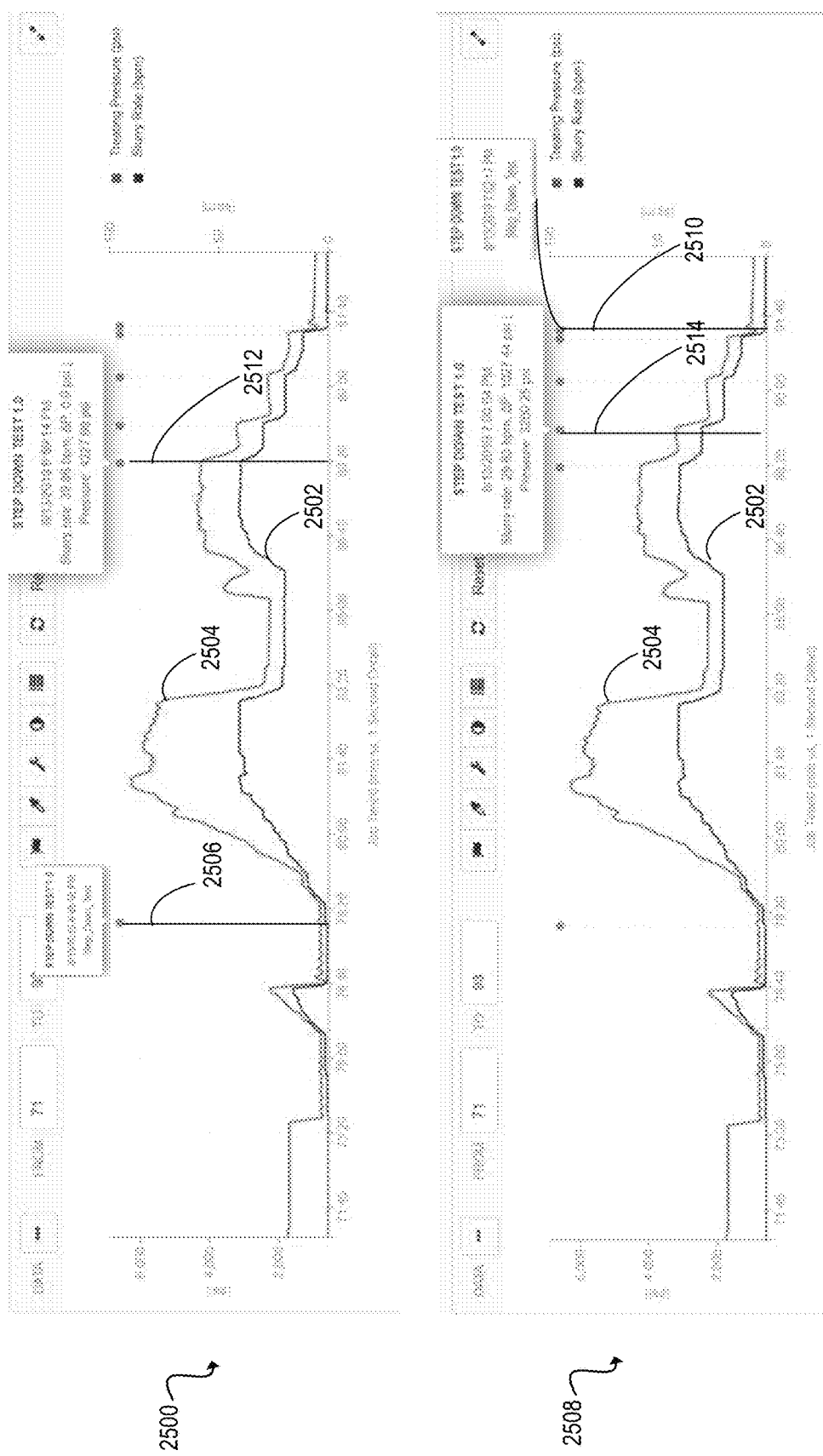
FIG. 25 illustrate example outputs of detected start and end values of a step-down test, according to one aspect of the present disclosure.

FIG. 25 illustrate example outputs of detected start and end values of a step-down test, according to one aspect of the present disclosure.

Graph 2500 shows smoothed slurry rate channel 2502 and smoothed treating pressure channel 2504 with an example flag 2506 indicative of start time of a SDT while graph 2508 shows an example flag 2510 indicative of end time of a SDT. Furthermore, graph 2500 shows an example flag 2512 at a first edge of a step on the treating pressure signal while graph 2508 illustrates an example flag 2514 at a second edge of the step following flag 2512 at the first edge to illustrate a change in pressure changes ΔP, which will be further described below. There may be several intermediary stages indicative of pressure changes ΔP that can be flagged in a similar manner as one example flagged with flags 2512 and 2514.

Once the start and end of the Step-Down Test is determined, then at S2412, controller 118 determines if pressure decreases are vertical or in step. In doing so, controller 118 evaluates the last (e.g., 180 seconds) of data to determine the standard deviation of a first derivative of the slurry rate channel. In one example, the first derivative of the slurry rate channel is inverted so the valleys in the signal become peaks. Controller 118 filters out the data that is lower than the standard deviation of the first derivative of the slurry rate channel value and finds the slurry rate peaks which are equivalent to the vertical decrease from step to step. If multiple peaks are found, the pressure decrease is in steps and if only one peak is found, the pressure decrease is vertical.

Thereafter and for step decreases in pressure, at S2414, controller 118 identifies and flags the STD. In doing so, controller 118 evaluates the last (e.g. last 450) rows of data and filters out the small valleys or values close to zero in the first derivative of slurry rate signal and keeps the large valleys (large negative values) where determination of small versus large valleys is based on a comparison of values to a threshold that is half the value of the standard deviation of first derivative of the slurry rate channel. Keeping only large valleys allows for filtering out the constant values of slurry rate (steps) and keeping the decreasing values of slurry rate. In one example, start of each valley corresponds to the edge of each step. The controller 118 then collects pressure values at each edge of step and calculates the magnitude of pressure decrease (delta Pressure, ΔP) from the previous edge of the step.

In one example, identified STDs and the Step-Down Test (SDT) analysis is used to calculate the perforation pressure drops and tortuosity pressure drops which contain important information about the design and execution of the hydraulic fracture treatment.)

In another aspect of the present disclosure and after performing the stage splitting and predicting start and end times of each stage, per processes described with reference to FIGS. 2-16, controller 118 may also perform a process for detecting well pressure monitoring during each identified stage. Such well pressure monitoring may be indicative of an active well communicating to an offset well, sometimes referred to as a fracture driven interaction (FDI). In most cases FDI is to be avoided, and hence understanding when an FDI occurs can be used to treat stages to avoid the same.

In one example, controller 118 determines the angle between the well pressure monitoring data stream (using preprocessed treating pressure channel) and the horizontal axis. Using a threshold (e.g. 60 degrees), controller 118 finds job times where the angle is greater than the threshold. Controller 118 flags such job time to indicate an active well. Controller 118 determines the angle as follows.

Figure 26:
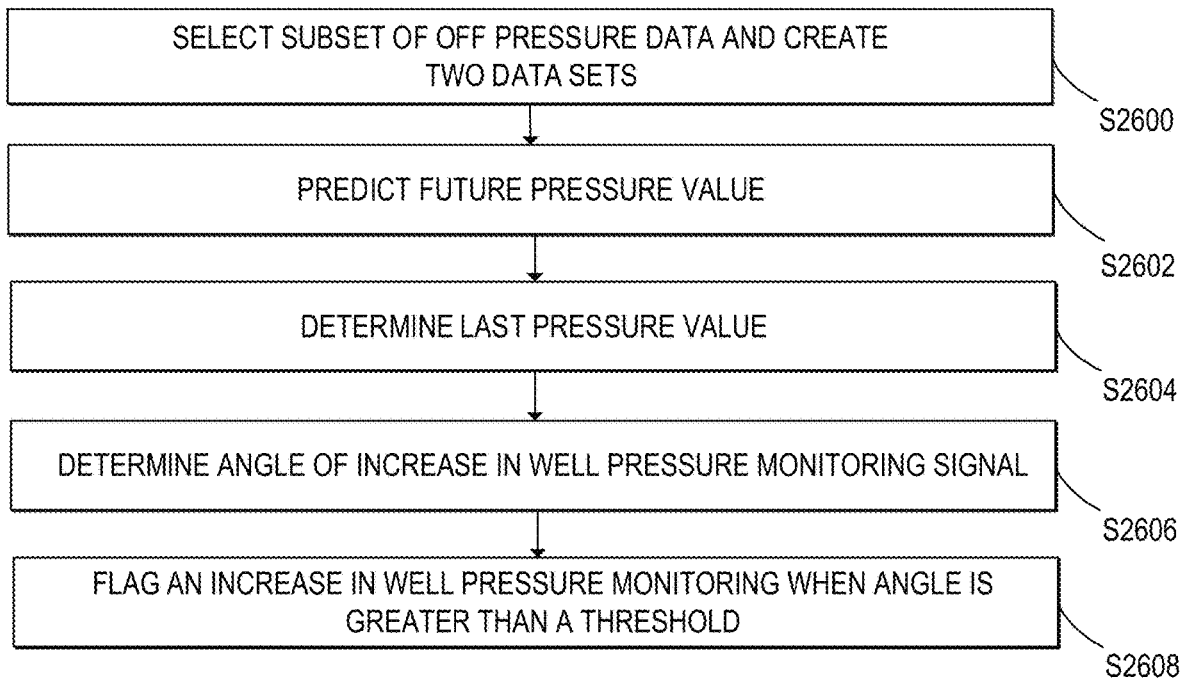
FIG. 26 is a flow chart of a process for detecting well pressure monitoring, according to one aspect of the present disclosure.

FIG. 26 is a flow chart of a process for detecting well pressure monitoring, according to one aspect of the present disclosure.

At S2600, controller 118 selects a number of rows (e.g., 50 rows) of well pressure monitoring data and creates two different data sets; the first data set has the initial 10 rows (20%) of well pressure monitoring data, and the second data set has the last 40 rows (80%).

At S2602, controller 118 applies linear regression to the first data set to predict future pressure value from the first 10 rows (predicted pressure value).

At S2604, controller 118 determines the last pressure value from the second data set and calculates the difference between the last pressure value and the predicted pressure value (Ay) which represents the magnitude of the pressure increase.

At S2606, controller 118 determines the angle of increase in the well pressure monitoring signal using equation (3) below:

$$\text{angle} = \arctan\left(\frac{Ay}{Ax}\right) \quad \text{Equation (3)}$$

where Ay is the difference between the last pressure value and the predicted pressure value and Ax is the number of rows used to train the linear regression (e.g., 10 rows).

When the angle is greater than the threshold (e.g., 60 degrees), at S2608, controller 118 places a flag at the specific job time where the pressure starts to increase to flag an active well. This value is also placed in the active well treating pressure signal warning to indicate a spike in the well pressure monitoring data.

With example systems and methods performing various analyses of in-field collected data automatically and in real-time, with reference to FIGS. 1-26, the disclosure now turns to example system components and architectures that can be used to implement the concepts described above such as controller 118.

Figure 27A:
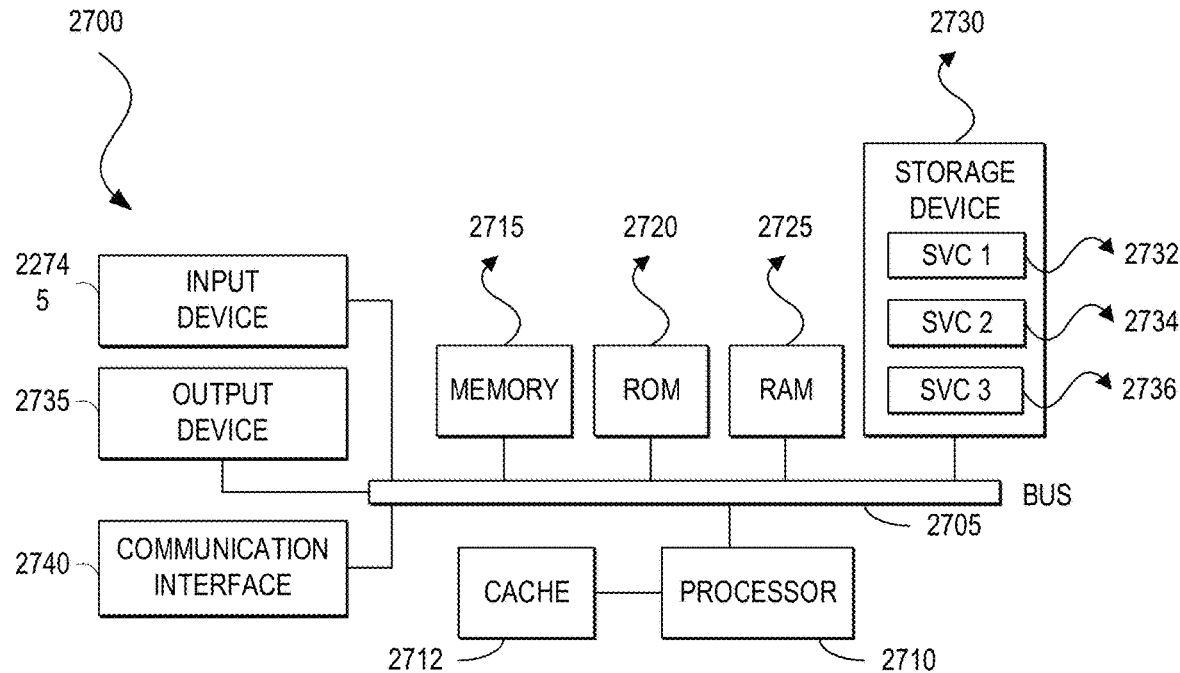
FIGS. 27A and 27B illustrate systems, according to one aspect of the present disclosure.
Figure 27B:
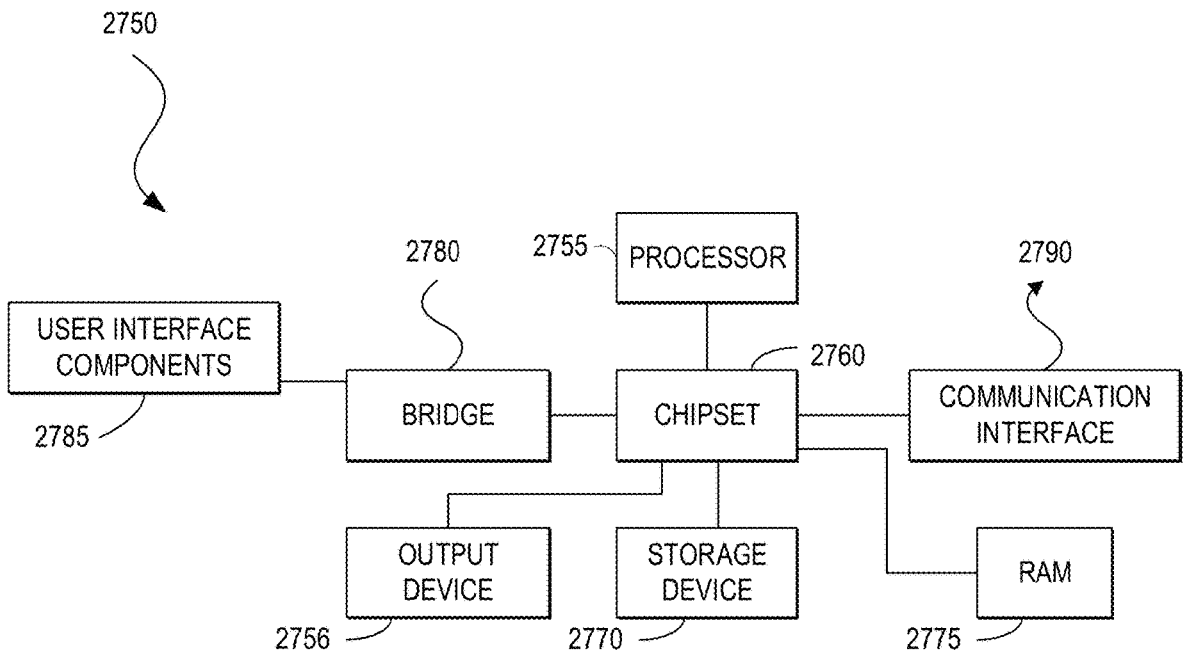

FIGS. 27A and 27B illustrate systems, according to one aspect of the present disclosure. The more appropriate system will be apparent to those of ordinary skill in the art when practicing the various embodiments. Persons of ordinary skill in the art will also readily appreciate that other systems are possible.

FIG. 27A illustrates an example of a bus computing system 2700 wherein the components of the system are in electrical communication with each other using a bus 2705. The computing system 2700 can include a processing unit (CPU or processor) 2710 and a system bus 2705 that may couple various system components including the system memory 2715, such as read only memory (ROM) 2720 and random access memory (RAM) 2725, to the processor 2710. The computing system 2700 can include a cache 2712 of high-speed memory connected directly with, in close proximity to, or integrated as part of the processor 2710. The computing system 2700 can copy data from the memory 2715, ROM 2720, RAM 2725, and/or storage device 2730 to the cache 2712 for quick access by the processor 2710. In this way, the cache 2712 can provide a performance boost that avoids processor delays while waiting for data. These and other modules can control the processor 2710 to perform various actions. Other system memory 2715 may be available for use as well. The memory 2715 can include multiple different types of memory with different performance characteristics. The processor 2710 can include any general purpose processor and a hardware module or software module, such as services (SVC) 1 2732, SVC 2 2734, and SVC 3 2736 stored in the storage device 2730, configured to control the processor 2710 as well as a special-purpose processor where software instructions are incorporated into the actual processor design. The processor 2710 may essentially be a completely self-contained computing system, containing multiple cores or processors, a bus, memory controller, cache, etc. A multi-core processor may be symmetric or asymmetric.

To enable user interaction with the computing system 2700, an input device 2745 can represent any number of input mechanisms, such as a microphone for speech, a touch-protected screen for gesture or graphical input, keyboard, mouse, motion input, speech and so forth. An output device 2735 can also be one or more of a number of output mechanisms known to those of skill in the art. In some instances, multimodal systems can enable a user to provide multiple types of input to communicate with the computing system 2700. The communications interface 2740 can govern and manage the user input and system output. There may be no restriction on operating on any particular hardware arrangement and therefore the basic features here may easily be substituted for improved hardware or firmware arrangements as they are developed.

The storage device 2730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 2730 can include the software SVCs 2732, 2734, 2736 for controlling the processor 2710. Other hardware or software modules are contemplated. The storage device 2730 can be connected to the system bus 2705. In some embodiments, a hardware module that performs a particular function can include a software component stored in a computer-readable medium in connection with the necessary hardware components, such as the processor 2710, bus 2705, output device 2735, and so forth, to carry out the function.

FIG. 27B illustrates an example architecture for a chipset computing system 2750 that can be used in accordance with an embodiment. The computing system 2750 can include a processor 2755, representative of any number of physically and/or logically distinct resources capable of executing software, firmware, and hardware configured to perform identified computations. The processor 2755 can communicate with a chipset 2760 that can control input to and output from the processor 2755. In this example, the chipset 2760 can output information to an output device 2765, such as a display, and can read and write information to storage device 2770, which can include magnetic media, solid state media, and other suitable storage media. The chipset 2760 can also read data from and write data to RAM 2775. A bridge 2780 for interfacing with a variety of user interface components 2785 can be provided for interfacing with the chipset 2760.

The user interface components 2785 can include a keyboard, a microphone, touch detection and processing circuitry, a pointing device, such as a mouse, and so on. Inputs to the computing system 2750 can come from any of a variety of sources, machine generated and/or human generated.

The chipset 2760 can also interface with one or more communication interfaces 2790 that can have different physical interfaces. The communication interfaces 2790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 2755 analyzing data stored in the storage device 2770 or the RAM 2775. Further, the computing system 2750 can receive inputs from a user via the user interface components 2785 and execute appropriate functions, such as browsing functions by interpreting these inputs using the processor 2755.

It will be appreciated that computing systems 2700 and 2750 can have more than one processor 2710 and 2755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims

We claim:

1. A method for controlling a well, the method comprising:
   receiving treating data for the well in real-time, the treating data including one or more of a treating pressure channel and a slurry rate channel;
   preprocessing the treating data;
   identifying one or more stages of one or more fracturing processes in association with which the treating data is received;
   identifying, automatically by a processing system and in real-time, a start time and an end time for each of the one or more stages, wherein identifying the start time comprises:
      clipping the slurry rate channel and the treating pressure channel;
      generating a binary channel using the clipped slurry rate and treating pressure channels;
      identifying one or more time instances when a value of the binary channel is equal to zero; and
      generating a flag for the start time of each stage at a last time instance when the value of the binary channel is zero;
   generating a visual output of the start time and the end time of each of the one or more stages;
   identifying, by the processing system in communication with a controller of one or more hydraulic fracturing equipment of the well and based on the processing system identifying the start time or the end time for each of the one or more stages, an abnormal pressure condition at the well; and
   automatically controlling, by the controller executing one or more control instructions and in response to the identification of the abnormal pressure condition at the well, the one or more hydraulic fracturing equipment in communication with the controller, wherein executing the one or more control instructions adjusts, in real time, a pressure within the well.

2. The method of claim 1, wherein identifying the one or more stages, the start time and the end time are based on using a trained machine learning analysis.

3. The method of claim 1, wherein identifying the one or more stages of the one or more fracturing processes comprises:

applying a stage splitting model to approximate the one or more stages;
detecting one or more pressure tests in association with the approximated one or more stages; and
refining the approximated one or more stages using the one or more pressure tests.

4. The method of claim 3, wherein the stage splitting model approximates the one or more stages by:
down-sampling the treating pressure channel and the slurry rate channel;
generating an auxiliary interstage channel that is indicative of gaps between two or more stages; and
flagging the one or more stages using the auxiliary interstage channel.

5. The method of claim 1, further comprising:
detecting, in at least one of the one or more stages, at least one instance of a pressure change, the pressure change being indicative of at least one operational issue during a fracturing process; and
generating a visual flag for each detected pressure change.

6. The method of claim 1, further comprising:
detecting, in at least one of the one or more stages, a step-down test; and
generating a visual flag for each detected step-down test.

7. The method of claim 1, wherein the identification of the one or more stages and the start time and the end time of the one or more stages are performed simultaneously for a plurality of wells.

8. The method of claim 1, further comprising:
detecting, in at least one of the one or more stages, a change in well pressure monitoring that is more than a threshold; and
generating a visual flag corresponding to the increase in the well pressure monitoring, the visual output identifying a corresponding job time and a corresponding active well.

9. A method for controlling a well, the method comprising:
receiving treating data for the well in real-time, the treating data including one or more of a treating pressure channel and a slurry rate channel;
preprocessing the treating data;
identifying one or more stages of one or more fracturing processes in association with which the treating data is received, wherein identifying the one or more stages of the one or more fracturing processes comprises:
applying a stage splitting model to approximate the one or more stages;
detecting one or more pressure tests in association with the approximated one or more stages; and
refining the approximated one or more stages using the one or more pressure tests;
identifying, automatically by a processing system and in real-time, a start time and an end time for each of the one or more stages, wherein detecting the one or more pressure tests comprises:
clipping slurry rate data of the slurry rate channel;
determining a slurry rate volume using the clipped slurry rate data;
normalizing the treating pressure channel and the slurry rate channel;
generating a binary pressure test channel based on the normalized treating pressure channel and the normalized slurry rate channel;
identifying the one or more pressure tests based on the binary pressure test channel;
identifying, by the processing system in communication with a controller of one or more hydraulic fracturing equipment of the well and based on the processing system identifying the start time or the end time for each of the one or more stages, an abnormal pressure condition at the well; and
automatically controlling, by the controller executing one or more control instructions and in response to the identification of the abnormal pressure condition at the well, the one or more hydraulic fracturing equipment in communication with the controller, wherein executing the one or more control instructions adjusts, in real time, a pressure within the well.

10. A method for controlling a well, the method comprising:
receiving treating data for the well in real-time, the treating data including one or more of a treating pressure channel and a slurry rate channel;
preprocessing the treating data;
identifying one or more stages of one or more fracturing processes in association with which the treating data is received;
identifying, automatically by a processing system and in real-time, a start time and an end time for each of the one or more stages, wherein identifying the end time comprises:
smoothing the slurry rate channel and the treating pressure channel;
generating an auxiliary stage volume channel based on the smoothed slurry rate channel;
generating an auxiliary pressure channel based on the smoothed treating pressure channel;
generating the end time when at least the auxiliary stage volume channel and the auxiliary pressure channel each satisfy a corresponding condition;
identifying, by the processing system in communication with a controller of one or more hydraulic fracturing equipment of the well and based on the processing system identifying the start time or the end time for each of the one or more stages, an abnormal pressure condition at the well; and
automatically controlling, by the controller executing one or more control instructions and in response to the identification of the abnormal pressure condition at the well, the one or more hydraulic fracturing equipment in communication with the controller, wherein executing the one or more control instructions adjusts, in real time, a pressure within the well.

11. A computing device comprising:
one or more memories having computer-readable instructions stored therein; and
one or more processors configured to execute the computer-readable instructions to perform a method of:
receiving treating data for a well in real-time, the treating data including one or more of a treating pressure channel and a slurry rate channel;
preprocessing the treating data;
identifying one or more stages of one or more fracturing processes in association with which the treating data is received;
identifying, automatically by a processing system and in real-time, a start time and an end time for each of the one or more stages, wherein identifying the start time comprises:
clipping the slurry rate channel and the treating pressure channel;

generating a binary channel using the clipped slurry rate and treating pressure channels;
identifying one or more time instances when a value of the binary channel is equal to zero; and
generating a flag for the start time of each stage at a last time instance when the value of the binary channel is zero;
generating a visual output of the start time and the end time of each of the one or more stages;
identifying, by the processing system in communication with a controller of one or more hydraulic fracturing equipment of the well and based on the processing system identifying the start time or the end time for each of the one or more stages, an abnormal pressure condition at the well; and
automatically controlling, by the controller executing one or more control instructions and in response to the identification of the abnormal pressure condition at the well, the one or more hydraulic fracturing equipment in communication with the controller, wherein executing the one or more control instructions adjusts, in real time, a pressure within the well.

12. The computing device of claim 11, wherein the identifying the start time and the end time are based on using a trained machine learning process.

13. The computing device of claim 11, wherein the identifying the one or more stages of the one or more fracturing processes comprises:
applying a stage splitting model to approximate the one or more stages;
detecting one or more pressure tests in association with the approximated one or more stages; and
refining the approximated one or more stages using the one or more pressure tests.

14. The computing device of claim 13, further comprising approximating the one or more stages by:
down-sampling the treating pressure channel and the slurry rate channel;
generating an auxiliary interstage channel that is indicative of gaps between two or more stages; and
flagging the one or more stages using the auxiliary interstage channel.

15. The computing device of claim 11, wherein the one or more processors are further configured to execute the computer-readable instructions to perform the operations of:
detecting, in at least one of the one or more stages, at least one instance of a pressure change, the pressure change being indicative of at least one operational issue during a fracturing process; and
generating a visual flag for each detected pressure change.

16. The computing device of claim 11, wherein the one or more processors are further configured to execute the computer-readable instructions to perform the operations of:
detecting, in at least one of the one or more stages, a step-down test; and
generating a visual flag for each detected step-down test.

17. The computing device of claim 11, wherein identifying the one or more stages and the start time and the end time of the one or more stages are performed simultaneously for a plurality of wells.

18. The computing device of claim 11, wherein the one or more processors are further configured to execute the computer-readable instructions to perform the operations of:
detecting, in at least one of the one or more stages, a change in well pressure monitoring that is more than a threshold; and
generating a visual flag corresponding to the increase in the well pressure monitoring, the visual output identifying a corresponding job time and a corresponding active well.

19. A computing device comprising:
one or more memories having computer-readable instructions stored therein; and
one or more processors configured to execute the computer-readable instructions to perform a method of:
receiving treating data for a well in real-time, the treating data including one or more of a treating pressure channel and a slurry rate channel;
preprocessing the treating data;
identifying one or more stages of one or more fracturing processes in association with which the treating data is received, wherein the identifying the one or more stages of the one or more fracturing processes comprises:
applying a stage splitting model to approximate the one or more stages;
detecting one or more pressure tests in association with the approximated one or more stages, detecting the one or more pressure tests by:
clipping slurry rate data of the slurry rate channel;
determining a slurry rate volume using the clipped slurry rate data;
normalizing the treating pressure channel and the slurry rate channel;
generating a binary pressure test channel based on the normalized treating pressure channel and the normalized slurry rate channel; and
identifying the one or more pressure tests based on the binary pressure test channel;
refining the approximated one or more stages using the one or more pressure tests;
identifying, automatically by a processing system and in real-time, a start time and an end time for each of the one or more stages;
identifying, by the processing system in communication with a controller of one or more hydraulic fracturing equipment of the well and based on the processing system identifying the start time or the end time for each of the one or more stages, an abnormal pressure condition at the well; and
automatically controlling, by the controller executing one or more control instructions and in response to the identification of the abnormal pressure condition at the well, the one or more hydraulic fracturing equipment in communication with the controller, wherein executing the one or more control instructions adjusts, in real time, a pressure within the well.

20. A computing device comprising:
one or more memories having computer-readable instructions stored therein; and
one or more processors configured to execute the computer-readable instructions to perform a method of:
receiving treating data for a well in real-time, the treating data including one or more of a treating pressure channel and a slurry rate channel;
preprocessing the treating data;
identifying one or more stages of one or more fracturing processes in association with which the treating data is received;
identifying, automatically by a processing system and in real-time, a start time and an end time for each of the one or more stages, wherein identifying the end time comprises:

smoothing the slurry rate channel and the treating pressure channel;

generating an auxiliary stage volume channel based on the smoothed slurry rate channel;

generating an auxiliary pressure channel based on the smoothed treating pressure channel;

generating the end time when at least the auxiliary stage volume channel and the auxiliary pressure channel each satisfy a corresponding condition;

identifying, by the processing system in communication with a controller of one or more hydraulic fracturing equipment of the well and based on the processing system identifying the start time or the end time for each of the one or more stages, an abnormal pressure condition at the well; and automatically controlling, by the controller executing one or more control instructions and in response to the identification of the abnormal pressure condition at the well, the one or more hydraulic fracturing equipment in communication with the controller, wherein executing the one or more control instructions adjusts, in real time, a pressure within the well.

* * * * *